US009514105B2

(12) United States Patent
Callens et al.

(10) Patent No.: US 9,514,105 B2
(45) Date of Patent: *Dec. 6, 2016

(54) REORDERING NODES IN A HIERARCHICAL STRUCTURE

(71) Applicant: Microsoft Technology Licensing, LLC, Redmond, WA (US)

(72) Inventors: Adam Spencer Callens, Redmond, WA (US); David Nelson Norelius, Redmond, WA (US); James Thomas Marshall, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 74 days.

This patent is subject to a terminal disclaimer.

(21) Appl. No.: 14/296,023

(22) Filed: Jun. 4, 2014

(65) Prior Publication Data

US 2014/0289613 A1    Sep. 25, 2014

Related U.S. Application Data

(63) Continuation of application No. 12/723,127, filed on Mar. 12, 2010, now Pat. No. 8,799,325.

(51) Int. Cl.
*G06F 7/00* (2006.01)
*G06F 17/22* (2006.01)
(Continued)

(52) U.S. Cl.
CPC ......... *G06F 17/2247* (2013.01); *G06F 3/0481* (2013.01); *G06F 9/4443* (2013.01); *G06F 17/24* (2013.01)

(58) Field of Classification Search
CPC ....... G06F 9/4443; G06F 3/0481; G06F 17/24
See application file for complete search history.

(56) References Cited

U.S. PATENT DOCUMENTS 4,531,150 A    7/1985  Amano
4,686,522 A    8/1987  Hernandez et al.
(Continued)

FOREIGN PATENT DOCUMENTS

CN    1530833 A    9/2004
EP    0 431 638 A1    6/1991
(Continued)

OTHER PUBLICATIONS

U.S. Appl. No. 13/621,614, Amendment and Response filed Sep. 28, 2015, 9 pgs.

(Continued)

*Primary Examiner* — Tarek Chbouki
(74) *Attorney, Agent, or Firm* — Tom Wong; Damon Rieth; Micky Minhas

(57) ABSTRACT

This disclosure describes a user interface and methods for quickly and easily modifying graphical content. Specifically, content having a hierarchical format may be received in a content pane. The hierarchical format may include one or more hierarchical levels and a plurality of content portions occupying one or more hierarchical positions within each of the one or more hierarchical levels. Further, a graphical definition may be applied to the content creating graphical content. As will be appreciated, the graphical content may comprise a hierarchical structure corresponding to the hierarchical format of the content. The hierarchical structure may include a plurality of nodes occupying one or more node positions within each of one or more node levels. A content portion occupying a hierarchical position may be reordered within a hierarchical level and may automatically cause a corresponding node in a corresponding node position to be reordered within a corresponding node level.

20 Claims, 10 Drawing Sheets

(51) Int. Cl.
  *G06F 3/0481* (2013.01)
  *G06F 9/44* (2006.01)
  *G06F 17/24* (2006.01)

(56) References Cited

U.S. PATENT DOCUMENTS

| | | |
|---|---|---|
| 4,996,665 A | 2/1991 | Nomura |
| 5,214,755 A | 5/1993 | Mason |
| 5,426,729 A | 6/1995 | Parker |
| 5,509,112 A | 4/1996 | Doi et al. |
| 5,535,134 A | 7/1996 | Cohn et al. |
| 5,557,722 A | 9/1996 | DeRose et al. |
| 5,596,691 A | 1/1997 | Good et al. |
| 5,619,631 A | 4/1997 | Schott |
| 5,649,216 A | 7/1997 | Sieber |
| 5,669,006 A | 9/1997 | Joskowicz et al. |
| 5,732,229 A | 3/1998 | Dickinson |
| 5,818,447 A | 10/1998 | Wolf et al. |
| 5,867,386 A | 2/1999 | Hoffberg et al. |
| 5,872,867 A | 2/1999 | Bergen |
| 5,903,902 A | 5/1999 | Orr et al. |
| 5,909,220 A | 6/1999 | Sandow |
| 5,956,043 A | 9/1999 | Jensen |
| 5,956,737 A | 9/1999 | King et al. |
| 5,999,731 A | 12/1999 | Yellin et al. |
| 6,057,842 A | 5/2000 | Knowlton et al. |
| 6,057,858 A | 5/2000 | Desrosiers |
| 6,072,480 A | 6/2000 | Gorbet et al. |
| 6,081,816 A | 6/2000 | Agrawal |
| 6,161,098 A | 12/2000 | Wallman |
| 6,166,738 A | 12/2000 | Robertson et al. |
| 6,173,286 B1 | 1/2001 | Guttman et al. |
| 6,189,132 B1 | 2/2001 | Heng et al. |
| 6,204,849 B1 | 3/2001 | Smith |
| 6,204,859 B1 | 3/2001 | Jouppi et al. |
| 6,256,650 B1 | 7/2001 | Cedar et al. |
| 6,289,502 B1 | 9/2001 | Garland et al. |
| 6,289,505 B1 | 9/2001 | Goebel |
| 6,292,194 B1 | 9/2001 | Powell, III |
| 6,301,704 B1 | 10/2001 | Chow et al. |
| 6,305,012 B1 | 10/2001 | Beadle et al. |
| 6,308,322 B1 | 10/2001 | Serocki et al. |
| 6,320,602 B1 | 11/2001 | Burkhardt et al. |
| 6,324,686 B1 | 11/2001 | Komatsu et al. |
| 6,405,225 B1 | 6/2002 | Apfel et al. |
| 6,448,973 B1 | 9/2002 | Guo et al. |
| 6,593,933 B1 | 7/2003 | Xu et al. |
| 6,667,750 B1 | 12/2003 | Halstead et al. |
| 6,691,282 B1 | 2/2004 | Rochford et al. |
| 6,715,130 B1 | 3/2004 | Eiche et al. |
| 6,774,899 B1 | 8/2004 | Ryall et al. |
| 6,819,342 B2 | 11/2004 | Kitagawa et al. |
| 6,826,727 B1 | 11/2004 | Mohr et al. |
| 6,826,729 B1 | 11/2004 | Giesen et al. |
| 6,944,818 B2 | 9/2005 | Card et al. |
| 6,944,830 B2 | 9/2005 | Card et al. |
| 6,957,191 B1 | 10/2005 | Belcsak et al. |
| 7,055,095 B1 | 5/2006 | Anwar |
| 7,107,525 B2 | 9/2006 | Purvis |
| 7,178,102 B1 | 2/2007 | Jones et al. |
| 7,209,815 B2 | 4/2007 | Grier et al. |
| 7,231,602 B1 | 6/2007 | Trulove |
| 7,325,186 B2 | 1/2008 | Jones |
| 7,348,982 B2 | 3/2008 | Schorr et al. |
| 7,379,074 B2 | 5/2008 | Gerhard et al. |
| 7,406,660 B1 | 7/2008 | Sikchi |
| 7,423,646 B2 | 9/2008 | Saini et al. |
| 7,478,079 B2 * | 1/2009 | Robertson ......... G06F 17/30292 |
| 7,743,325 B2 | 6/2010 | Berker et al. |
| 7,747,944 B2 | 6/2010 | Gerhard et al. |
| 7,750,924 B2 | 7/2010 | Berker |
| 8,134,575 B2 | 3/2012 | Wong et al. |
| 8,269,790 B2 | 9/2012 | Wong et al. |
| 8,438,486 B2 | 5/2013 | Waldman et al. |
| 8,510,657 B2 | 8/2013 | Gilbert et al. |
| 8,791,955 B2 | 7/2014 | Schorr et al. |
| 8,799,325 B2 | 8/2014 | Callens et al. |
| 2001/0035875 A1 | 11/2001 | Suzuki et al. |
| 2001/0051962 A1 | 12/2001 | Plotkin |
| 2002/0065852 A1 | 5/2002 | Hendrickson et al. |
| 2002/0107842 A1 | 8/2002 | Biebesheimer et al. |
| 2002/0111969 A1 | 8/2002 | Halstead, Jr. |
| 2003/0065601 A1 | 4/2003 | Gatto |
| 2003/0069931 A1 * | 4/2003 | Omura ................. G06F 3/0481 709/205 |
| 2003/0079177 A1 | 4/2003 | Brintzenhofe et al. |
| 2003/0218641 A1 * | 11/2003 | Longobardi ...... G06F 17/30067 715/853 |
| 2004/0021647 A1 | 2/2004 | Iwema et al. |
| 2004/0041838 A1 | 3/2004 | Adusumilli et al. |
| 2004/0111672 A1 | 6/2004 | Bowman et al. |
| 2004/0133854 A1 | 7/2004 | Black |
| 2004/0145603 A1 | 7/2004 | Soares |
| 2004/0148571 A1 | 7/2004 | Lue |
| 2004/0205602 A1 | 10/2004 | Croeni |
| 2005/0001837 A1 | 1/2005 | Shannon |
| 2005/0007382 A1 | 1/2005 | Schowtka et al. |
| 2005/0034083 A1 | 2/2005 | Jaeger |
| 2005/0091584 A1 | 4/2005 | Bogdan et al. |
| 2005/0094206 A1 | 5/2005 | Tonisson |
| 2005/0094207 A1 | 5/2005 | Lo et al. |
| 2005/0132283 A1 | 6/2005 | Diwan et al. |
| 2005/0157926 A1 | 7/2005 | Moravec et al. |
| 2005/0216832 A1 | 9/2005 | Giannetti |
| 2005/0240858 A1 | 10/2005 | Croft et al. |
| 2005/0273730 A1 | 12/2005 | Card et al. |
| 2005/0289466 A1 | 12/2005 | Chen |
| 2006/0064642 A1 | 3/2006 | Iyer |
| 2006/0066627 A1 | 3/2006 | Gerhard et al. |
| 2006/0066631 A1 | 3/2006 | Schorr et al. |
| 2006/0066632 A1 | 3/2006 | Wong |
| 2006/0070005 A1 | 3/2006 | Gilbert |
| 2006/0209093 A1 | 9/2006 | Berker et al. |
| 2006/0212801 A1 | 9/2006 | Berker et al. |
| 2006/0277476 A1 | 12/2006 | Lai |
| 2006/0294460 A1 | 12/2006 | Chao et al. |
| 2007/0006073 A1 | 1/2007 | Gerhard et al. |
| 2007/0055939 A1 | 3/2007 | Furlong et al. |
| 2007/0112832 A1 | 5/2007 | Wong |
| 2007/0186168 A1 | 8/2007 | Waldman et al. |
| 2008/0046803 A1 | 2/2008 | Beauchamp et al. |
| 2008/0136822 A1 | 6/2008 | Schorr et al. |
| 2008/0178107 A1 | 7/2008 | Lee et al. |
| 2008/0282147 A1 | 11/2008 | Schorr |
| 2008/0288916 A1 | 11/2008 | Tazoe |
| 2009/0019453 A1 | 1/2009 | Kodaganur |
| 2009/0119577 A1 | 5/2009 | Almbladh |
| 2009/0327954 A1 | 12/2009 | Danton |
| 2011/0055687 A1 | 3/2011 | Bhandar et al. |
| 2011/0225548 A1 | 9/2011 | Callens et al. |
| 2012/0127178 A1 | 5/2012 | Wong et al. |
| 2013/0024791 A1 | 1/2013 | Wong et al. |
| 2013/0232410 A1 | 9/2013 | Waldman et al. |
| 2013/0290839 A1 | 10/2013 | Gilbert et al. |
| 2014/0292767 A1 | 10/2014 | Schorr et al. |

FOREIGN PATENT DOCUMENTS

| | | |
|---|---|---|
| EP | 1 111 543 A2 | 6/2001 |
| EP | 1 111 543 A3 | 11/2002 |
| EP | 1643450 | 5/2012 |
| JP | 04-130585 A | 5/1992 |
| JP | 06-309128 | 11/1994 |
| JP | H09-109351 | 4/1997 |
| JP | 2001-500294 | 1/2001 |
| JP | 2002507289 A | 3/2002 |
| JP | 2002507301 A | 3/2002 |
| JP | 2003-052582 | 2/2003 |
| JP | 2003044464 A | 2/2003 |
| JP | 2004-220561 | 8/2004 |
| JP | 2005-275890 | 12/2005 |
| JP | 2006-506713 A | 2/2006 |
| KR | 10-1999-0029911 A | 4/1999 |
| KR | 10-1999-0034152 A | 5/1999 |

(56) References Cited

FOREIGN PATENT DOCUMENTS

| KR | 10-2004-0041979 | 5/2004 |
|---|---|---|
| KR | 10-2004-0048236 A | 6/2004 |
| KR | 1020040073870 | 8/2004 |
| MX | 277871 | 7/2010 |
| RU | 2142162 | 11/1999 |
| RU | 2218602 C2 | 12/2003 |
| TW | 578067 | 3/2004 |
| TW | 200406734 A | 5/2004 |
| WO | WO 8200726 | 3/1982 |
| WO | WO 95/00916 | 1/1995 |
| WO | WO 9855953 | 10/1998 |
| WO | 9924267 | 5/1999 |
| WO | WO 01/39019 A2 | 11/2000 |
| WO | WO 01/39019 A2 | 5/2001 |
| WO | WO 03/052582 A1 | 6/2003 |
| WO | WO 2004/046972 A1 | 6/2004 |

OTHER PUBLICATIONS

U.S. Appl. No. 13/855,386, Amendment and Response filed Oct. 14, 2015, 12 pgs.
Indian Office Action in Application 2284/DEL/2005, mailed Feb. 17, 2015, 2 pgs.
U.S. Appl. No. 13/621,614, Office Action mailed Jun. 26, 2015, 6 pgs.
U.S. Appl. No. 13/855,386, Office Action mailed Jul. 14, 2015, 20 pgs.
"Show Me Microsoft Office Powerpoint 2003" by Steve Johnson, Perspection, Inc., Publisher: Que, Publication Date: Oct. 2, 2003, Print ISBN-10; 0-7897-3009-X, 530 pgs.
U.S. Appl. No. 13/933,390, Office Action mailed Feb. 2, 2016, 13 pgs.
U.S. Appl. No. 13/621,614, Office Action mailed Jan. 29, 2016, 4 pgs.
"Create Diagrams in Word 2002, Excel 2002, and Powerpoint 2002"; http://office.microsoft.com/en-usassistance/HA-010346141033.aspx.; 2 pages.
"de Mail reader," downloaded Mar. 24, 2009, 2 pages. URL: http://de.openoffice.org/services/ReadMMsg?list=annouce&msg. No translation available, 2 pgs.
"Internet as a Source of Prior Art," downloaded Mar. 16, 2009 from Wikipedia, 3 pages. URL: http//en.wikipedia.org/wiki/Internet_as_a_source_of_prior_art, downloaded Mar. 24, 2009 (in German) 3 pages.
"OpenOffice.org," downloaded Mar. 24, 2009; 19 pages. "OpenOffice.org," downloaded Mar. 24, 2009 (D8 in the Minutes from Oral Proceedings dated Jun. 8, 2009—in German, no translation available); URL: http://www.ooo-portal.de/modules.pnp?op=modload&name=News&, 19 pgs.
"Exploring the Layouts", 1999 software Publishing Corporation, 2 pgs.
"Proquis Compliance Management & Document Control Solutions"; http://wwws.proquis.com/allclear-text2chart.asp, 1 page.
A. C. Beers et al., "Rendering from Compressed Textures," Proceedings of SIGGRAPH '96, Aug. 1996, 4 pgs.
A. Fournier et al., "Computer Rendering of Stochastic Models," Communications of the ACM, Jun. 1982, vol. 25, No. 6, pp. 371-384.
About assigning columns in data files to custom property fields, Microsoft Office Online. Copyright 2006 Microsoft Corporation. [Last Accessed: Apr. 27, 2006], 1 pg.
About breaking your organization chart across multiple pages, Microsoft Office Online. Copyright 2006 Microsoft Corporation. [Last Accessed: Apr. 27, 2006], 1 pg.
About charts, Microsoft Office Online. Copyright 2006 Microsoft Corporation. [Last Accessed: Apr. 27, 2006], 3 pgs.
About choosing actions and events for organization chart shapes, Microsoft Office Online. Copyright 2006 Microsoft Corporation. [Last Accessed: Apr. 27, 2006], 1 pg.
About choosing data file columns, Microsoft Office Online. Copyright 2006 Microsoft Corporation. [Last Accessed: Apr. 27, 2006], 1 pg.
About combination charts, Microsoft Office Online. Copyright 2006 Microsoft Corporation. [Last Accessed: Apr. 27, 2006], 1 pg.
About defining a new ODBC data source, Microsoft Office Online. Copyright 2006 Microsoft Corporation. [Last Accessed: Apr. 27, 2006], 1 pg.
About importing data, Microsoft Office Online. Copyright 2006 Microsoft Corporation. [Last Accessed: Apr. 27, 2006], 3 pgs.
About mapping fields from your data file to a Gantt chart, Microsoft Office Online. Copyright 2006 Microsoft Corporation. [Last Accessed: Apr. 27, 2006], 1 pg.
About Microsoft Visual Basic .NET code to UML mapping, Microsoft Office Online. Copyright 2006 Microsoft Corporation. [Last Accessed: Apr. 27, 2006], 3 pgs.
About Microsoft Visual C# code to UML mapping, Microsoft Office Online. Copyright 2006 Microsoft Corporation. [Last Accessed: Apr. 27, 2006), 3 pgs.
About Microsoft Visual C++ 7.0 code to UML mapping, Microsoft Office Online. Copyright 2006 Microsoft Corporation. [Last Accessed: Apr. 27, 2006], 3 pgs.
About ODBC data sources and organization charts, Microsoft Office Online. Copyright 2006 Microsoft Corporation. [Last Accessed: Apr. 27, 2006], 1 pg.
About OLAP source data in PivotTable and PivotChart reports, Microsoft Office Online. Copyright 2006 Microsoft Corporation. [Last Accessed: Apr. 27, 2006], 3 pgs.
About Organization Chart Wizard data, Microsoft Office Online. Copyright 2006 Microsoft Corporation. [Last Accessed: Apr. 27, 2006]1 pg.
About PivotTable and PivotChart source data, Microsoft Office Online. Copyright 2006 Microsoft Corporation. [Last Accessed: Apr. 27, 2006], 3 pgs.
About PivotTable reports, Microsoft Office Online. Copyright 2006 Microsoft Corporation. [Last Accessed: Apr. 27, 2006], 2 pgs.
About reverse engineering code to the UML, Microsoft Office Online. Copyright 2006 Microsoft Corporation. [Last Accessed: Apr. 27, 2006], 1 pg.
About selecting delimiters in a Gantt chart, Microsoft Office Online. Copyright 2006 Microsoft Corporation. [Last Accessed: Apr. 27, 2006], 1 pg.
About using Microsoft Query to retrieve external data, Microsoft Office Online. Copyright 2006 Microsoft Corporation. [Last Accessed: Apr. 27, 2006], 3 pgs.
Add, link, edit, or remove titles in a chart, Microsoft Office Online. Copyright 2006 Microsoft Corporation. [Last Accessed: Apr. 27, 2006], 2 pgs.
Advanced Timeline Options dialog box, Microsoft Office Online. Copyright 2006 Microsoft Corporation. [Last Accessed: Apr. 27, 2006], 1 pg.
Australian Examiners First Report dated Apr. 21, 2010 in Application No. 2005203708, 2 pgs.
Australian Examiners First Report filed in Application No. 2005202720, dated Apr. 22, 2010; 2 pages.
Australian Examiners Second Report filed in Application No. 2005202720, dated Aug. 30, 2010; 2 pages.
Australian Notice of Allowance in Application 2005202720 mailed Feb. 10, 2011, 3 pgs.
Australian Notice of Allowance in Application 2005203708 mailed Jun. 23, 2010, 3 pgs.
Australian Notice of Allowance in Application 2005203711 mailed Nov. 9, 2010, 3 pgs.
Australian Office Action in Application 2005203711 mailed Apr. 23, 2010, 2 pgs.
Available chart types, Microsoft Office Online. Copyright 2006 Microsoft Corporation. [Last Accessed: Apr. 27, 2006], 7 pgs.
Bugfix-Release OpenOffice 1.0.3.1, Erschienen (Update), no English translation, Apr. 23, 2003, 1 page.
Canadian Notice of Allowance in Application 2511037, mailed May 29, 2013, 1 page.
Canadian Notice of Allowance in Application 2517409, mailed Sep. 20, 2013, 1 page.

(56) References Cited

OTHER PUBLICATIONS

Canadian Office Action in Application 2511037, mailed Nov. 14, 2012, 3 pgs.
Canadian Office Action in Application 2517399, mailed Mar. 22, 2013, 2 pgs.
Canadian Office Action in Application 2517409, mailed Feb. 11, 2013, 6 pgs.
Canadian Office Action in Application 2517409, mailed Sep. 19, 2012, 6 pgs.
CASEX ANNEX, dated Apr. 11, 2010 (email communication from European Examiner on May 12, 20011 in European Application 05105366.8); 1 page.
Change Date and Time Formats dialog box, Microsoft Office Online. Copyright 2006 Microsoft Corporation. [Last Accessed: Apr. 7, 2006], 1 pg.
Change Mapping dialog box, Microsoft Office Online. Copyright 2006 Microsoft Corporation. [Last Accessed: Apr. 27, 2006], 1 pg.
Chart Wizard, Microsoft Office Online. Copyright 2006 Microsoft Corporation. [Last Accessed: Apr. 27, 2006], 4 pgs.
Chinese 1st Office Action in Application 200510088525.6 mailed May 9, 2008, 18 pgs.
Chinese 1st Office Action in Application 200510099124.0 mailed Jun. 20, 2008, 19 pgs.
Chinese 2nd Office Action in Application 200510088525.6 mailed Nov. 7, 2008, 10 pgs.
Chinese 2nd Office Action in Application 200510099124.0 mailed Dec. 26, 2008, 9 pgs.
Chinese 2nd Office Action in Application 201010587370.1, mailed Mar. 12, 2012, 8 pgs.
Chinese 3rd Office Action in Application 200510088525.6 mailed Feb. 27, 2009, 9 pgs.
Chinese 3rd Office Action in Application 200510099124.0 mailed Apr. 17, 2009, 16 pgs.
Chinese 3rd Office Action in Application 201010587370.1, mailed Aug. 8, 2013, 8 pgs.
Chinese Decision on Re-Examination in Application 201010587370.1, mailed Apr. 7, 2013, 2 pgs.
Chinese Final Rejection in Application 201010587370.1, mailed Sep. 5, 2012, 6 pgs.
Chinese First Office Action in Application 201010587370.1, mailed Sep. 8, 2011, 8 pgs.
Chinese Fourth Office Action in Application No. 200510099124.0, dated Sep. 4, 2009, 7 pages.
Chinese Notice of Allowance in Application 200510088525.6 mailed Jul. 17, 2009, 4 pgs.
Chinese Notice of Allowance in Application 200510099124.0 mailed Sep. 15, 2010, 4 pgs.
Chinese Notice of Allowance in Application 2006100044984 mailed Jan. 22, 2010, 2 pgs.
Chinese Notice of Allowance in Application No. 200510099652.6, mailed Dec. 26, 2008, 4 pgs.
Chinese Office Action dated Aug. 29, 2008 cited in Application No. 2006100044498.4, 15 pgs.
Chinese Office Action dated Jul. 4, 2008 cited in Application No. 200510099652.6, 9 pgs.
Chinese Patent Office Sixth [sic-Fifth] Office Action in Application No. 200510099124.0, dated May 10, 2010, 6 pages.
Chinese Second Office Action dated Feb. 20, 2009 in Application No. 2006100044498.4, 19 pgs.
Chinese Third Office Action dated Jun. 19, 2009 in Application No. 2006100044498.4, 9 pgs.
Configure Interval dialog box, Microsoft Office Online. Copyright 2006 Microsoft Corporation. [Last Accessed: Apr. 27, 2006], 1 pg.
Configure Milestone dialog box, Microsoft Office Online. Copyright 2006 Microsoft Corporation. [Last Accessed: Apr. 27, 2006], 1 pg.
Configure Timeline dialog box (Time Format tab), Microsoft Office Online. Copyright 2006 Microsoft Corporation. [Last Accessed: Apr. 27, 2006], 1 pg.
Configure Timeline dialog box (Time Period tab), Microsoft Office Online. Copyright 2006 Microsoft Corporation. [Last Accessed: Apr. 27, 2006] 1 pg.
Configure Working Time dialog box, Microsoft Office Online. Copyright 2006 Microsoft Corporation. [Last Accessed: Apr. 27, 2006], 1 pg.
Create a chart from data in a PivotTable report, Microsoft Office Online. Copyright 2006 Microsoft Corporation. [Last Accessed: Apr. 27, 2006], 1 pg.
Create a chart, Microsoft Office Online. Copyright 2006 Microsoft Corporation. [Last Accessed: Apr. 27, 2006], 2 pgs.
Create a Gantt chart in Excel, Microsoft Office Online. Copyright 2006 Microsoft Corporation. [Last Accessed: Apr. 27, 2006], 2 pgs.
Create a PivotChart report, Microsoft Office Online. Copyright 2006 Microsoft Corporation. [Last Accessed: Apr. 27, 2006], 3 pgs.
Create a PivotTable report, Microsoft Office Online. Copyright 2006 Microsoft Corporation. [Last Accessed: Apr. 27, 2006], 2 pgs.
Creating a chart, Microsoft Office Online. Copyright 2006 Microsoft Corporation. [Last Accessed: Apr. 27, 2006, ]2 pgs.
Creating a Stock chart, Microsoft Office Online. Copyright 2006 Microsoft Corporation. [Last Accessed: Apr. 27, 2006], 2 pgs.
Creating a Surface chart, Microsoft Office Online. Copyright 2006 Microsoft Corporation. [Last Accessed: Apr. 27, 2006], 3 pgs.
Creating Pie of Pie and Bar of Pie charts, Microsoft Office Online. Copyright 2006 Microsoft Corporation. [Last Accessed: Apr. 27, 2006], 3 pgs.
CSS Zen Garden, "The Beauty in CSS Design", retrieved from Archive.org. <http://web.archive.org/web/20031001180317/http://www.csszengarden.com/>, Oct. 1, 2003. Retrieved Nov. 8, 2009, 3 pgs.
D. J. Heeger et al., "Pyramid-Based Texture Analysis/Synthesis," pp. 1-10.
D. R. Peachey, "Solid Texturing of Complex Surfaces," Computer Graphics, vol. 19, No. 3, Jul. 1985, pp. 279-286.
DeBonet, JS, "Multiresolution Sampling Procedure for Analysis and Synthesis of Texture Images", Learning & Vision Group, Artificial Intelligence Laboratory, Massachusetts Institute of Technology, 8 pgs.
Diagram, Oxford English Dictionary, 2nd Edition (1989), Oxford University Press 1989, downloaded from http://www.oed.com/oed/00063080 (email communication from European Examiner on May 12, 2011 in European Application 05105366.8); 2 pgs.
European Brief Communication in Application 06111105.0, mailed Sep. 17, 2012, 10 pgs.
European Communication dated Dec. 17, 2008 in Application No. 06111105.0, 8 pgs.
European Communication dated Jul. 10, 2009 in Application No. 06111105.0, 6 pgs.
European Decision to Refuse a European Application dated Jun. 12, 2009 in Application No. 05108636.1, 39 pages.
European Decision to Refuse in EP Application 06111105.0, mailed Oct. 5, 2012, 27 pgs.
European E-mail communication from European Examiner cited in EP Application 05105366.8 dated May 12, 2011, 2 pgs.
European Exam Report in EP Application 05105366.8 mailed Apr. 30, 2009, 9 pgs.
European Extended Search Report for EP 05 10 8636.1-2218, Jan. 2, 2006, 7 pgs.
European Minutes from Oral Proceedings, dated Jun. 8, 2009, in EP Application No. 05108636.1, 42 pages.
European Minutes of the Sep. 27, 2012 Oral Proceedings in EP Application 06111105.0, mailed Oct. 5, 2012, 3 pgs.
European Notice of Allowance in Application 05105366.8 mailed Jun. 21, 2011, 6 pgs.
European Official Communication in EP Application 051086361 mailed Jun. 1, 2007, 7 pgs.
European Oral Summons in EP Application 06111105.0, mailed May 15, 2012, 10 pgs.
European Search Report dated Feb. 13, 2006 in Application 05108658.5, 7 pgs.
European Search Report for EP 05105366.8, Jan. 2, 2006, 3 pgs.

(56) References Cited

OTHER PUBLICATIONS

Example of a reverse-engineered solution: FM Stocks, Microsoft Office Online. Copyright 2006 Microsoft Corporation. [Last Accessed: Apr. 27, 2006], 1 pg.
Export a SharePoint list to a spreadsheet, Microsoft Office Online. Copyright 2006 Microsoft Corporation. [Last Accessed: Apr. 27, 2006], 2 pgs.
Five ways to subtotal values in repeating data, Microsoft Office Online. Copyright 2006 Microsoft Corporation. [Last Accessed: Apr. 27, 2006], 5 pgs.
Gallant, John and Bergevin, Holly, Archive.org archive of "CSS Flyouts—Part One," [online] Jun. 24, 2005 [accessed Nov. 13, 2006], CommunityMX, Retrieved from Internet <UEL:http://web.archive.org/web/20050624075147/http://www.communitymx.com/content/article.cfm?page=3&cid=55A69>, 2 pgs.
Gantt Chart Options dialog box (Date tab), Microsoft Office Online. Copyright 2006 Microsoft Corporation. [Last Accessed: Apr. 27, 2006], 1 pg.
Gantt Chart Options dialog box (Format tab), Microsoft Office Online. Copyright 2006 Microsoft Corporation. [Last Accessed: Apr. 27, 2006], 1 pg.
H.G. Schuster, "Deterministic Chaos, An Introduction," Second Revised Edition, pp. 200-207.
Heise Online: "OpenOffice 1.1.5 verfügbar" downloaded Jul. 28, 2010 (D5 in the Minutes from Oral Proceedings dated Jun. 8, 2009—in German, URL: http://www.heise.de/newsticker/meldung/OpenOffice-1-1-5-verfuegbar-130148.html English translation attached); 2 pages.
Insert Column dialog box, Microsoft Office Online. Copyright 2006 Microsoft Corporation. [Last Accessed: Apr. 27, 2006], 1 pg.
Intelligent User Interfaces: Components of Intelligent Interfaces http://web.cs.wpLedu/Research/airgllntlntlintint-paper-components.html [Last Accessed: Nov. 30, 2005], 4 pgs.
Interactive information visualization. http://prefuse.sourceforge.net/ [Last Accessed: Nov. 30, 2005].
J. Torborg et al., "Talisman: Commodity Realtime 3D Graphics for the PC," Proceedings of SIGGRAPH 1996, 11 pgs.
J.P. Lewis, "Algorithms for Solid Noise Synthesis," Computer Graphics, vol. 23, No. 3, Jul. 1989, pp. 263-270.
Jan Smith, "Jan's PowerPoint Advanced: Images", pp. 7 and 8. Obtained online on Mar. 12, 2008 at: http://web.archive.org/web/2005020822247/http://www.jegsworks.com/Lessons/presentations/advanced/images.htm, 9 pgs.
Japanese Final Notice of Rejection dated Aug. 10, 2011 in Application 2006-064583, 3 pgs.
Japanese Final Notice of Rejection in Application 2011-245199, mailed Sep. 7, 2012, 4 pgs.
Japanese Notice of Rejection in Application 2011-245199, mailed Apr. 16, 2012, 3 pgs.
Japanese Office Action dated Apr. 12, 2011 in JP Application 2005-253627, 5 pgs.
Japanese Patent Office Notice of Rejection in Application No. 2005187817, dated Nov. 11, 2010; 5 pages.
Japanese Patent Office Notice of Rejection in Application No. 2005275890, dated Nov. 18, 2010; 9 pages.
K. Perlin, "An Image Synthesizer," Computer Graphics, vol. 19, No. 3, Jul. 1985, pp. 287-296.
Keyboard shortcuts, Microsoft Office Online. Copyright 2006 Microsoft Corporation. [Last Accessed: Apr. 27, 2006], 17 pgs.
Korean Final Notice of Rejection in Application 10-2005-0057172, mailed Aug. 29, 2012, 2 pgs.
Korean Notice of Final Rejection in Application 10-2005-00738480, mailed Apr. 30, 2012, 6 pgs.
Korean Notice of Preliminary Rejection and Translation Summary in Application 10200573848, mailed Dec. 12, 2011, 6 pgs.
Korean Notice of Preliminary Rejection dated Feb. 23, 2012 in Application No. 10-2006- 0007338, 6 pgs.
Korean Notice of Preliminary Rejection in Application 1020050073710, mailed Jan. 31, 2012, 1 pg. English translation.
Korean Notice of Preliminary Rejection in Application 10-2005-57172, mailed Jan. 25, 2012, 1 pg. English translation.
Korean Preliminary Rejection (English translation), Application 102006-0007338, mailed Feb. 23, 2012, 2 pgs.
LingCh by Elod Csirmaz—Retrieved Date: Jan. 11, 2010, http://www.postminart.org/csirmaz/lingch.txt., 5 pgs.
M. Cox et al., "Multi-Level Texture Caching for 3D Graphics Hardware," In Proceedings of the 25th International Symposium on Computer Architecture, 1998, pp. 86-97.
M. Pharr et al., "Rendering Complex Scenes with Memory-Coherent Ray Tracing," Proceedings of SIGGRAPH 1997, pp. 1-8.
Malaysian Adverse Report in Application PI20054064, mailed Jan. 15, 2013, 2 pgs.
Malaysian Adverse Report in Application PI20054064, mailed Nov. 15, 2011, 3 pgs.
Malaysian Examination Report in Application PI 20054063, mailed Sep. 15, 2011, 3 pgs.
Mexican Office Action dated Dec. 4, 2008 in Application No. PA/a/2005/009276 (not in English), 4 pgs.
Mexican Office Action dated May 25, 2009 in Application No. PA/a/2005/009276, 10 pgs.
Microsoft Office PowerPoint 2003 11.6564.6568 with Service Pack 2, Part of Microsoft Office Professional Edition 2003, 9 pgs.
Microsoft Office Word 2003 11.6568.6568 with Service Pack 2, Part of Microsoft Office Professional Edition 2003, 7 pgs.
Modeling exponential growth, Microsoft Office Online. Copyright 2006 Microsoft Corporation. [Last translate Accessed: Apr. 27, 2006], 2 pgs.
Online Training Solutions, Inc et al., "Microsoft Office PowerPoint 2003 Step by Step", Microsoft Press, Aug. 27, 2003, 105 pgs.
Outline a list of data in a worksheet, Microsoft Office Online. Copyright 2006 Microsoft Corporation. [Last Accessed: Apr. 27, 2006], 14 pgs.
Overview of security and protection in Excel, Microsoft Office Online. Copyright 2006 Microsoft Corporation. [Last Accessed: Apr. 27, 2006], 4 pgs.
P. Hanrahan et al., "A Language for Shading and Lighting Calculations," Computer Graphics, vol. 24, No. 4, Aug. 1990, pp. 289-298.
PivotTable and PivotChart Wizard, Microsoft Office Online. Copyright 2006 Microsoft Corporation. [Last Accessed: Apr. 27, 2006], 3 pgs.
PivotTable reports 101, Microsoft Office Online. Copyright 2006 Microsoft Corporation. [Last Accessed: Apr. 27, 2006], 11 pgs.
PivotTable terminology demystified, Microsoft Office Online. Copyright 2006 Microsoft Corporation. [Last Accessed: Apr. 27, 2006], 4 pgs.
R.L. Cook et al., "The Reyes Image Rendering Architecture," Computer Graphics, vol. 21, No. 4, Jul. 1987, pp. 95-102.
Reverse engineer Visual Studio .NET source code, Microsoft Office Online. Copyright 2006 Microsoft Corporation. [Last Accessed: Apr. 27, 2006], 1 pg.
Reverse engineered code in the Model Explorer tree view, Microsoft Office Online. Copyright 2006 Microsoft Corporation. [Last Accessed: Apr. 27, 2006], 2 pgs.
Roth, et al. "SageTools: An Intelligent Environment for Sketching, Browsing, and Customizing Data-Graphics". School of Computer Science. Carnegie Mellon University. Proceedings CHI'95 Human Factors in Computing Systems, ACM, May 1995, 2 pgs.
Russian Notice of Allowance in Application 2005130349 mailed Oct. 30, 2009, 7 pgs.
Russian Notice of Allowance in Application 2005130361 mailed Oct. 7, 2009, 16 pgs.
Russian Notice of Allowance in Ru application 2005120365 mailed Oct. 6, 2009, 4 pgs.
Screen Shots (Examiner generated) taken on Mar. 18, 2010 of Microsoft PowerPoint 2002, publicly released Mar. 5, 2001); U.S. Appl. No. 11/013,655, 6 pgs.
Screen shots of Microsoft PowerPoint, 2002, (U.S. Appl. No. 11/013,655 on Jan. 9, 2009), 15 pgs.
Show or hide a chart legend or data table, Micorsoft Office Online. Copyright 2006 Microsoft Corporation. [Last Accessed: Apr. 27, 2006], 2 pgs.

(56) References Cited

OTHER PUBLICATIONS

Singleton, Roderick, "OpenOffice.org User Guide for Version 1.1. X", May 7, 2004, Online, XP002348571; retrieved from the Internet: URL:www.openoffice.org>, retrieved Sep. 30, 2005; pp. 253-284.
Statistica, StatSoft User Interface, http://www.statsoft.com/uniquefeatureslinterface.html (Last Accessed: Nov. 30,2005), 6 pgs.
Styling Nested Lists, [online] Oct. 19, 2003 [accessed Nov. 13, 2006], SimpleBits, LLC, Retrieved from Internet<URL:http://www.simplebits.com/ notebook/2003/10/19/styling_nested_lists.htmll> pp. 1-5.
Synchronize Interval dialog box, Microsoft Office Online. Copyright 2006 Microsoft Corporation. [Last Accessed: Apr. 27, 2006], 1 pg.
Synchronize Milestone dialog box, Microsoft Office Online. Copyright 2006 Microsoft Corporation. [Last Accessed: Apr. 27, 2006], 1 pg.
Taiwan Notice of Allowance in Application 94126264, mailed Jun. 10, 2013, 4 pgs.
Taiwan Notice of Allowance in Application 94127756, mailed Aug. 23, 2012, 4 pgs.
Taiwan Search Report in Application 094127756, mailed Jan. 3, 2012, 1 pg.
The University of Alberta, "PowerPoint Basics", pp. 1 and 7. obtained online on Mar. 6, 2008 at: http://web.archive.org/web/20050207083815/http://www.quasar.ualberta.ca/edpy202/tutorial/PowerPointIpptBasics/pptBasics.htm, 17 pgs.
Top tips for Excel: Charts and graphics, Microsoft Office Online. Copyright 2006 Microsoft Corporation. [Last Accessed: Apr. 27, 2006], 2 pgs.
Troubleshoot charts, Microsoft Office Online. Copyright 2006 Microsoft Corporation. [Last Accessed: Apr. 27, 2006], 11 pgs.
Troubleshoot OLAP cubes, Microsoft Office Online. Copyright 2006 Microsoft Corporation. [Last Accessed: Apr. 27, 2006], 3 pgs.
Troubleshoot PivotChart reports, Microsoft Office Online. Copyright 2006 Microsoft Corporation. [Last Accessed: Apr. 27, 2006], 7 pgs.
Troubleshoot PivotTable reports, Microsoft Office Online. Copyright 2006 Microsoft Corporation. [Last Accessed: Apr. 27, 2006], 7 pgs.
U.S. Appl. No. 09/578,574, Office Action mailed Oct. 23, 2001, 16 pgs.
U.S. Appl. No. 10/955,271, Advisory Action mailed Jan. 9, 2007, 3 pgs.
U.S. Appl. No. 10/957,103, Advisory Action mailed Jan. 17, 2008, 3 pgs.
U.S. Appl. No. 10/957,103, Amendment and Response filed Jan. 23, 2008, 19 pgs.
U.S. Appl. No. 10/957,103, Amendment and Response filed Nov. 18, 2009, 28 pgs.
U.S. Appl. No. 10/957,103, Amendment and Response filed Nov. 23, 2010, 23 pgs.
U.S. Appl. No. 10/957,103, Amendment and Response filed Dec. 12, 2008, 17 pgs.
U.S. Appl. No. 10/957,103, Amendment and Response filed Dec. 14, 2012, 14 pgs.
U.S. Appl. No. 10/957,103, Amendment and Response filed Dec. 26, 2007, 18 pgs.
U.S. Appl. No. 10/957,103, Amendment and Response filed Mar. 22, 2013, 16 pgs.
U.S. Appl. No. 10/957,103, Amendment and Response filed Apr. 14, 2009, 24 pgs.
U.S. Appl. No. 10/957,103, Amendment and Response filed May 3, 2013, 3 pgs.
U.S. Appl. No. 10/957,103, Amendment and Response filed Jun. 15, 2010, 24 pgs.
U.S. Appl. No. 10/957,103, Amendment and Response filed Jun. 17, 2008, 16 pgs.
U.S. Appl. No. 10/957,103, Amendment and Response filed Jun. 22, 2012, 28 pgs.
U.S. Appl. No. 10/957,103, Amendment and Response filed Jul. 8, 2011, 21 pgs.
U.S. Appl. No. 10/957,103, Amendment and Response filed Aug. 16, 2007, 17 pgs.
U.S. Appl. No. 10/957,103, Amendment filed Jan. 27, 2012, 26 pgs.
U.S. Appl. No. 10/957,103, Final Office Action mailed Sep. 27, 2011, 19 pgs.
U.S. Appl. No. 10/957,103, Notice of Allowance mailed Oct. 5, 2012, 5 pgs.
U.S. Appl. No. 10/957,103, Notice of Allowance mailed Apr. 11, 2013, 7 pgs.
U.S. Appl. No. 10/957,103, Office Action mailed Jan. 3, 2013, 7 pgs.
U.S. Appl. No. 10/957,103, Office Action mailed Feb. 22, 2012, 19 pgs.
U.S. Appl. No. 10/957,103, Office Action mailed Apr. 13, 2011, 19 pgs.
U.S. Appl. No. 11/013,630, Office Action mailed Jan. 22, 2008, 2 pgs.
U.S. Appl. No. 11/013,630, Petition dated Mar. 17, 2008, 2 pgs.
U.S. Appl. No. 11/013,630, Petition Decision dated Mar. 18, 2008, 1 page.
U.S. Appl. No. 11/013,630, Petition Decision dated Jul. 21, 2008, 1 page.
U.S. Appl. No. 11/013,655, Amendment and Response filed Jan. 24, 2011, 16 pgs.
U.S. Appl. No. 11/013,655, Amendment and Response filed Oct. 14, 2008, 14 pgs.
U.S. Appl. No. 11/013,655, Amendment and Response filed Nov. 18, 2009, 15 pgs.
U.S. Appl. No. 11/013,655, Amendment and Response filed May 11, 2009, 17 pgs.
U.S. Appl. No. 11/013,655, Amendment and Response filed Aug. 11, 2008, 13 pgs.
U.S. Appl. No. 11/013,655, Amendment and Response filed Aug. 24, 2010, 21 pgs.
U.S. Appl. No. 11/013,655, Notice of Allowance mailed Jan. 7, 2011, 5 pgs.
U.S. Appl. No. 11/013,655, Office Action mailed Oct. 25, 2010, 15 pgs.
U.S. Appl. No. 11/081,323, Advisory Action mailed Sep. 18, 2007, 3 pgs.
U.S. Appl. No. 11/081,324, Examiners Amendment Communication mailed Aug. 12, 2009, 2 pgs.
U.S. Appl. No. 11/081,324, Examiners Amendment Communication mailed Aug. 4, 2009, 2 pgs.
U.S. Appl. No. 11/081,324, Examiners Amendment Communication mailed Sep. 11, 2009, 2 pgs.
U.S. Appl. No. 11/081,324, Petition dated Oct. 5, 2009, 1 page.
U.S. Appl. No. 11/351,341, Amendment and Response filed Oct. 19, 2009, 14 pgs.
U.S. Appl. No. 11/351,341, Amendment and Response filed Dec. 12, 2012, 9 pgs.
U.S. Appl. No. 11/351,341, Amendment and Response filed Mar. 2, 2011, 11 pgs.
U.S. Appl. No. 11/351,341, Amendment and Response filed Apr. 14, 2009, 18 pgs.
U.S. Appl. No. 11/351,341, Amendment and Response filed Jul. 2, 2012, 21 pgs.
U.S. Appl. No. 11/351,341, Amendment and Response filed Jul. 7, 2010, 17 pgs.
U.S. Appl. No. 11/351,341, Amendment and Response filed Sep. 12, 2011, 16 pgs.
U.S. Appl. No. 11/351,341, Notice of Allowance mailed Jan. 2, 2013, 22 pgs.
U.S. Appl. No. 11/351,341, Notice of Allowance mailed Oct. 22, 2012, 21 pgs.
U.S. Appl. No. 11/351,341, Office Action mailed Jan. 7, 2010, 32 pgs.
U.S. Appl. No. 11/351,341, Office Action mailed Feb. 3, 2012, 34 pgs.
U.S. Appl. No. 11/351,341, Office Action mailed Mar. 20, 2008, 18 pgs.

(56) References Cited

OTHER PUBLICATIONS

U.S. Appl. No. 11/351,341, Office Action mailed May 12, 2011, 25 pgs.
U.S. Appl. No. 11/351,341, Office Action mailed Aug. 7, 2009, 24 pgs.
U.S. Appl. No. 11/351,341, Office Action mailed Sep. 2, 2010, 32 pgs.
U.S. Appl. No. 12/035,878, Amendment and Response filed Jan. 28, 2011, 14 pgs.
U.S. Appl. No. 12/035,878, Amendment and Response filed Nov. 28, 2011, 15 pgs.
U.S. Appl. No. 12/035,878, Amendment and Response filed Feb. 21, 2013, 14 pgs.
U.S. Appl. No. 12/035,878, Amendment and Response filed Apr. 26, 2012, 14 pgs.
U.S. Appl. No. 12/035,878, Amendment and Response filed Jul. 14, 2011, 14 pgs.
U.S. Appl. No. 12/035,878, Amendment and Response filed Aug. 21, 2012, 15 pgs.
U.S. Appl. No. 12/035,878, Amendment and Response filed Sep. 5, 2013, 14 pgs.
U.S. Appl. No. 12/035,878, Final Office Action mailed Nov. 26, 2012, 32 pgs.
U.S. Appl. No. 12/035,878, Final Office Action mailed Apr. 14, 2011, 28 pgs.
U.S. Appl. No. 12/035,878, Office Action mailed Jan. 27, 2012, 27 pgs.
U.S. Appl. No. 12/035,878, Office Action mailed Oct. 28, 2010, 30 pgs.
U.S. Appl. No. 12/035,878, Office Action mailed Nov. 8, 2013, 35 pgs.
U.S. Appl. No. 12/035,878, Office Action mailed May 15, 2012, 37 pgs.
U.S. Appl. No. 12/035,878, Office Action mailed May 28, 2013, 31 pgs.
U.S. Appl. No. 12/035,878, Office Action mailed Aug. 26, 2011, 27 pgs.
U.S. Appl. No. 12/723,127, Amendment and Response filed Nov. 6, 2012, 14 pgs.
U.S. Appl. No. 12/723,127, Amendment and Response filed Jun. 26, 2012, 17 pgs.
U.S. Appl. No. 12/723,127, Notice of Allowance mailed Dec. 17, 2013, 11 pgs.
U.S. Appl. No. 12/723,127, Notice of Allowance mailed Aug. 8, 2013, 9 pgs.
U.S. Appl. No. 12/723,127, Office Action mailed Feb. 27, 2012, 19 pgs.
U.S. Appl. No. 12/723,127, Office Action mailed Aug. 6, 2012, 23 pgs.
U.S. Appl. No. 13/362,879, Notice of Allowance mailed May 14, 2012, 5 pgs.
U.S. Appl. No. 10/955,271, Office Action dated Apr. 17, 2007, 16 pgs.
U.S. Appl. No. 10/955,271, Amendment and Response filed Jan. 16, 2007, 12 pgs.
U.S. Appl. No. 10/955,271, Amendment and Response filed Dec. 4, 2006, 14 pgs.
U.S. Appl. No. 10/955,271, Amendment and Response filed Jul. 24, 2006, 13 pgs.
U.S. Appl. No. 10/955,271, Amendment and Response filed Jul. 31, 2007, 16 pgs.
U.S. Appl. No. 10/955,271, Notice of Allowance mailed Oct. 12, 2007, 7 pgs.
U.S. Appl. No. 10/955,271, Notice of Allowance mailed Dec. 14, 2007, 12 pgs.
U.S. Appl. No. 10/955,271, Office Action dated Apr. 20, 2006, 10 pgs.
U.S. Appl. No. 10/955,271, Office Action dated Oct. 3, 2006, 12 pgs.
U.S. Appl. No. 10/957,103, Office Action dated Feb. 18, 2010, 18 pgs.
U.S. Appl. No. 10/957,103, Office Action dated Jul. 21, 2009, 24 pgs.
U.S. Appl. No. 10/957,103, Final Office Action dated Aug. 31, 2010, 19 pages.
U.S. Appl. No. 10/957,103, Office Action dated Jan. 14, 2009, 22 pgs.
U.S. Appl. No. 10/957,103, Office Action dated Mar. 19, 2008, 20 pgs.
U.S. Appl. No. 10/957,103, Office Action dated May 16, 2007, 16 pgs.
U.S. Appl. No. 10/957,103, Office Action dated Oct. 23, 2007, 25 pgs.
U.S. Appl. No. 10/957,103, Office Action dated Sep. 12, 2008, 25 pgs.
U.S. Appl. No. 11/013,630, Amendment and Response filed Jan. 31, 2007, 13 pgs.
U.S. Appl. No. 11/013,630, Notice of Allowance mailed Mar. 16, 2007, 7 pgs.
U.S. Appl. No. 11/013,630, Notice of Allowance mailed Jul. 26, 2007, 4 pgs.
U.S. Appl. No. 11/013,630, Office Action dated Oct. 31, 2006, 10 pgs.
U.S. Appl. No. 11/013,655, Notice of Allowance mailed Jan. 17, 2012, 5 pgs.
U.S. Appl. No. 11/013,655, Notice of Allowance mailed Jan. 30, 2012, 2 pgs.
U.S. Appl. No. 11/013,655, Office Action dated Apr. 9, 2008, 18 pgs.
U.S. Appl. No. 11/013,655, Office Action dated Aug. 19, 2009, 20 pgs.
U.S. Appl. No. 11/013,655, Office Action dated Jan. 9, 2009, 16 pgs.
U.S. Appl. No. 11/013,655, Office Action dated May 25, 2010, 31 pgs.
U.S. Appl. No. 11/081,323, Advisory Action mailed Oct. 31, 2008, 3 pgs.
U.S. Appl. No. 11/081,323, Amendment and Response filed Oct. 29, 2007, 11 pgs.
U.S. Appl. No. 11/081,323, Amendment and Response filed Apr. 20, 2007, 14 pgs.
U.S. Appl. No. 11/081,323, Amendment and Response filed Apr. 23, 2008, 11 pgs.
U.S. Appl. No. 11/081,323, Amendment and Response filed May 18, 2009, 13 pgs.
U.S. Appl. No. 11/081,323, Amendment and Response filed Sep. 18, 2008, 13 pgs.
U.S. Appl. No. 11/081,323, Amendment and Response filed Sep. 6, 2007, 12 pgs.
U.S. Appl. No. 11/081,323, Notice of Allowance mailed Dec. 1, 2009, 4 pgs.
U.S. Appl. No. 11/081,323, Notice of Allowance mailed Dec. 16, 2009, 4 pgs.
U.S. Appl. No. 11/081,323, Notice of Allowance mailed Feb. 23, 2010, 4 pgs.
U.S. Appl. No. 11/081,323, Notice of Allowance mailed Aug. 13, 2009, 6 pgs.
U.S. Appl. No. 11/081,323, Notice of Allowance mailed Sep. 18, 2009, 2 pgs.
U.S. Appl. No. 11/081,323, Office Action date Jan. 23, 2008, 9 pgs.
U.S. Appl. No. 11/081,323, Office Action dated Feb. 18, 2009, 12 pgs.
U.S. Appl. No. 11/081,323, Office Action dated Jan. 22, 2007, 10 pgs.
U.S. Appl. No. 11/081,323, Office Action dated Jul. 18, 2008, 13 pgs.
U.S. Appl. No. 11/081,323, Office Action dated Jul. 6, 2007, 11 pgs.
U.S. Appl. No. 11/081,324, Advisory Action mailed Jan. 29, 2009, 3 pgs.
U.S. Appl. No. 11/081,324, Advisory Action mailed Feb. 29, 2008, 3 pgs.
U.S. Appl. No. 11/081,324, Amendment and Response mailed Jan. 26, 2009, 17 pgs.

(56) References Cited

OTHER PUBLICATIONS

U.S. Appl. No. 11/081,324, Amendment and Response mailed Feb. 11, 2008, 15 pgs.
U.S. Appl. No. 11/081,324, Amendment and Response mailed Sep. 12, 2008, 15 pgs.
U.S. Appl. No. 11/081,324, Amendment and Response mailed Sep. 28, 2007, 16 pgs.
U.S. Appl. No. 11/081,324, Notice of Allowance mailed Nov. 30, 2009, 6 pgs.
U.S. Appl. No. 11/081,324, Notice of Allowance mailed Mar. 5, 2010, 6 pgs.
U.S. Appl. No. 11/081,324, Notice of Allowance mailed Jun. 10, 2009, 12 pgs.
U.S. Appl. No. 11/081,324, Office Action dated Dec. 11, 2007, 15 pgs.
U.S. Appl. No. 11/081,324, Office Action dated Jun. 29, 2007, 16 pgs.
U.S. Appl. No. 11/081,324, Office Action dated May 12, 2008, 15 pgs.
U.S. Appl. No. 11/081,324, Office Action dated Nov. 26, 2008, 18 pgs.
U.S. Appl. No. 11/172,279, Advisory Action mailed Oct. 24, 2008, 3 pgs.
U.S. Appl. No. 11/172,279, Advisory Action mailed Aug. 23, 2007, 3 pgs.
U.S. Appl. No. 11/172,279, Amendment and Response mailed Jan. 11, 2010, 21 pgs.
U.S. Appl. No. 11/172,279, Amendment and Response mailed Oct. 16, 2008, 14 pgs.
U.S. Appl. No. 11/172,279, Amendment and Response mailed Nov. 19, 2007, 9 pgs.
U.S. Appl. No. 11/172,279, Amendment and Response mailed Feb. 18, 2009, 14 pgs.
U.S. Appl. No. 11/172,279, Amendment and Response mailed Feb. 27, 2007, 12 pgs.
U.S. Appl. No. 11/172,279, Amendment and Response mailed Jun. 6, 2008, 11 pgs.
U.S. Appl. No. 11/172,279, Amendment and Response mailed Jul. 28, 2009, 21 pgs.
U.S. Appl. No. 11/172,279, Amendment and Response mailed Aug. 17, 2007, 9 pgs.
U.S. Appl. No. 11/172,279, Final Office Action dated Aug. 19, 2008, 11 pgs.
U.S. Appl. No. 11/172,279, Final Office Action dated May 17, 2007, 13 pgs.
U.S. Appl. No. 11/172,279, Notice of Allowance mailed Apr. 2, 2010, 8 pgs.
U.S. Appl. No. 11/172,279, Office Action dated Apr. 29, 2009, 13 pgs.
U.S. Appl. No. 11/172,279, Office Action dated Mar. 6, 2008, 11 pgs.
U.S. Appl. No. 11/172,279, Office Action dated Nov. 12, 2009, 19 pgs.
U.S. Appl. No. 11/172,279, Office Action dated Nov. 27, 2006, 11 pgs.
Using charts and diagrams in the classroom, Microsoft Office Online. Copyright 2006 Microsoft Corporation. [Last Accessed: Apr. 27, 2006], 5 pgs.
Using Excel 2003 with earlier versions of Excel, Microsoft Office Online. Copyright 2006 Microsoft Corporation. [Last Accessed: Apr. 27, 2006], 4 pgs.
V.I. Arnold et al., "Ergodic Problems of Classical Mechanics," W.A. Benjamin, Inc., pp. v-ix & pp. 1-51.
Visio 2003 Bible, Chapter 10 (pp. 187-202), Chapter 12 (pp. 223-238), Chapter 13 (pp. 239-252) and Chapter 14 (pp. 253-270), copyright 2004 by Wiley Publishing Company (email communication from European Examiner on May 12, 2011 in European Application 05105366.8); 69 pgs.
Where is the Chart menu?, Microsoft Office Online. Copyright 2006 Microsoft Corporation. [Last Accessed: Apr. 27, 2006], 1 pg.
Work with Visio model diagrams in Visual Studio .NET', Microsoft Office Online. Copyright 2006 Microsoft Corporation. [Last Accessed: Apr. 27, 2006), 1 pg.
Y. Xu et al., "Chaos-Based Texture Synthesis," Visual Computing Group, Microsoft Research China, pp. 1-9.
yEd Graph Editor—Published Date: 2009; New yEd version 3.4.1, http://www.yworks.com/en/products_yed_about.html, 5 pgs.
Young, Michael J., "Microsoft Office System Inside Out"—2003 Edition, Michael Halvorson, 2003, p. 267.
Canadian Examiners Report in Application 2517399, mailed Nov. 29, 2013, 4 pgs.
Malaysian Notice of Allowance in Application PI 20054064, mailed Oct. 31, 2013, 2 pgs.
Korean Notice of Preliminary Rejection in Application (with English translation), in Application 10-2005-73848, mailed Nov. 18, 2013, 8 pgs.
Malaysian Notice of Allowance in Application PI 20054063, mailed Jul. 15, 2013, 2 pgs.
U.S. Appl. No. 12/035,878, Amendment and Response filed Feb. 10, 2014, 15 pgs.
U.S. Appl. No. 12/035,878, Notice of Allowance mailed Mar. 14, 2014, 10 pgs.
U.S. Appl. No. 12/723,127, Notice of Allowance mailed Feb. 28, 2014, 8 pgs.
Chinese Notice of Allowance in Application 201010587370.1, mailed Feb. 13, 2014, 4 pgs.
Russian Notice of Allowance in Application 2010100807, received Jan. 31, 2014, 6 pgs.
U.S. Appl. No. 12/035,878, Amendment filed Apr. 22, 2014, 3 pgs.
U.S. Appl. No. 12/723,127, Amendment filed Apr. 22, 2014, 1 pg.
Canadian Notice of Allowance in Application 2517399, mailed Sep. 5, 2014, 2 pgs.
U.S. Appl. No. 13/621,614, Amendment and Response filed Apr. 14, 2016, 9 pgs.
U.S. Appl. No. 13/933,390, Amendment and Response filed May 2, 2016, 20 pgs.
U.S. Appl. No. 13/621,614, Notice of Allowance mailed May 23, 2016, 5 pgs.
U.S. Appl. No. 13/933,390, Notice of Allowance mailed Jun. 21, 2016, 7 pgs.
U.S. Appl. No. 13/855,386, Amendment and Response filed Jun. 21, 2016, 12 pgs.
U.S. Appl. No. 13/855,386, Notice of Allowance mailed Aug. 12, 2016, 11 pgs.
Wenwen, D. et al., "Hierarchical Topics: Visually Exploring Large Text Collections Using Topic Hierarchies", Dec. 2013, IEEE, vol. 19, No. 12, pp. 2002-2011.
Mighlani, D. et al., "Intelligent Hierarchical Layout Segmentation of Document Images on the Basis of Colour Content", Dec. 1997, IEEE Tencon, pp. 191-194.

* cited by examiner

REORDERING NODES IN A HIERARCHICAL STRUCTURE

RELATED APPLICATIONS

This application is a continuation of U.S. patent application Ser. No. 12/723,127 (now U.S. Pat. No. 8,799,325), entitled "REORDERING NODES IN A HIERARCHICAL STRUCTURE," filed Mar. 12, 2010, which application is related to U.S. patent application Ser. No. 10/957,103, (now U.S. Pat. No. 8,510,657), entitled "EDITING THE TEXT OF AN ARBITRARY GRAPHIC VIA A HIERARCHICAL LIST," filed on Sep. 30, 2004, the entire disclosures of which is are hereby incorporated by reference.

INTRODUCTION

Visual aids help people understand information. Computer programs, such as the Microsoft® PowerPoint® presentation application, automate the task of creating visual presentations of information in a graphical format. Such graphics programs generally allow users to convey information more efficiently and effectively by arranging the information in easily understandable visual layouts and styles.

Graphical representations of information, or content, may contain information with both textual and graphical characteristics. Textual characteristics generally refer to the written matter within the graphical content. Graphical characteristics generally refer to the pictorial or other visual features of the graphical content. Depending on the information and the audience, a user may select an appropriate visual diagram to optimize the presentation of the information. However, after selecting an appropriate diagram, traditional graphics applications may require the user to consume considerable time and effort to input the information into the selected visual diagram.

It is with respect to this general environment that the present disclosure is directed.

SUMMARY

This disclosure describes a user interface and methods for quickly and easily modifying graphical content. Specifically, the present methods and systems described herein provide for receiving content having a hierarchical format in a content pane. The hierarchical format may include one or more hierarchical levels and a plurality of hierarchical positions within each of the one or more hierarchical levels. In addition, embodiments of the user interface may provide one or more galleries of graphical definitions for presenting the content. Specifically, a plurality of graphical definitions may be provided as selection options within ribbons, menus, and drop-downs of the user interface, as described herein. Each graphical definition comprises a combination of a layout definition and a style definition. Thus, when a graphical definition (i.e., a layout definition combined with a style definition) is applied to the content, graphical content is created. As will be appreciated, the graphical content may comprise a hierarchical structure corresponding to the hierarchical format of the content. The hierarchical structure may include one or more node levels and a plurality of nodes within each of the one or more node levels.

According to the disclosed embodiments, a hierarchical position may be selected and easily reordered within a hierarchical level in the content pane and the change may be substantially simultaneously reflected by reordering a corresponding node within a node level in the graphics pane. Additionally or alternatively, any child hierarchical positions associated with the selected hierarchical position may be automatically reordered along with the selected hierarchical position. Other embodiments provide that a node may be selected and easily reordered within a node level in the graphics pane and the change may be substantially simultaneously reflected by reordering a corresponding hierarchical position within a hierarchical level in the content pane.

Embodiments of the present disclosure may include systems, methods, and computer storage media for editing graphical content. Embodiments may further comprise accepting content in a content pane, wherein the content comprises a plurality of content portions displayed in a hierarchical format comprising one or more hierarchical levels. At least one of the one or more hierarchical levels may comprise a plurality of hierarchical positions and each content portion may occupy one of the plurality of hierarchical positions. A selection for at least one graphical definition may be received and the at least one selected graphical definition may comprise a layout and a style for presenting the content. The at least one selected graphical definition may be applied to the content to produce the graphical content. The graphical content may be simultaneously displayed in a graphics pane separate from the content pane. Further, the graphical content may comprise a plurality of nodes in a hierarchical structure corresponding to the hierarchical format. The hierarchical structure may comprise one or more node levels corresponding to the one or more hierarchical levels and each of the one or more node levels may comprise a plurality of node positions corresponding to the plurality of hierarchical positions. Each node may correspond to a content portion and may occupy a corresponding one of the plurality of node positions. A change to the content may be received in the content pane and the change may include reordering a selected content portion within one of the one or more hierarchical levels. A node corresponding to the selected content portion may be automatically reordered within a corresponding node level in the graphics pane as the change to the content is received in the content pane.

These and various other features as well as advantages which characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims herein as well as the appended drawings.

It is to be understood that both the foregoing general description and the following detailed description are exemplary and explanatory and are intended to provide further explanation for the appended claims.

DETAILED DESCRIPTION

Although the methods and user interface introduced above and discussed in detail below may be useful in a variety of user-friendly computer applications, the present disclosure will discuss the implementation of these techniques for use with computer graphics creation and editing. The technology described in the context of computer graphics applications could be adapted for use with other computer applications requiring simplified and intuitive creation and editing of data or textual content.

This disclosure describes a user interface and methods for quickly and easily modifying graphical content. Specifically, the present methods provide for receiving content having a hierarchical format in a content pane and applying a selected graphical definition to the content to create graphical content in a graphics pane. The graphical content may further comprise a hierarchical structure corresponding to the hierarchical format of the content. Thereafter, a hierarchical position may be selected and easily reordered within a hierarchical level in the content pane and the change may be immediately reflected by reordering a corresponding node within a node level in the graphics pane. Additionally or alternatively, any child hierarchical positions associated with the selected hierarchical position may be automatically reordered along with the selected hierarchical position. Other embodiments provide that a node may be selected and easily reordered within a node level in the graphics pane and the change may be immediately reflected by reordering a corresponding hierarchical position within a hierarchical level in the content pane.

Figure 1:
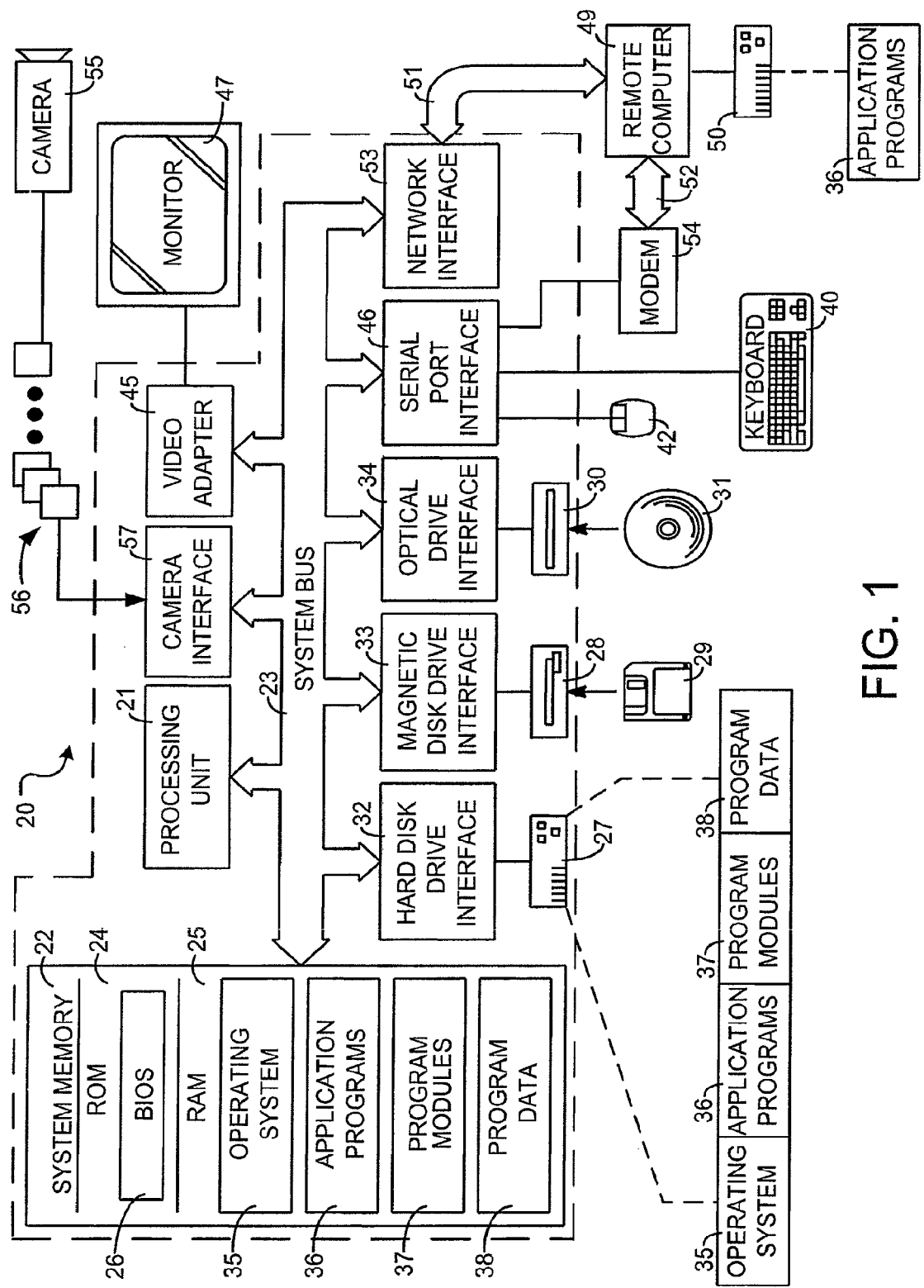
FIG. 1 is a functional diagram illustrating an embodiment of a computing environment and a basic computing device that may provide the user interface and the graphics creation and editing system as described herein.

FIG. 1 is a functional diagram illustrating an embodiment of a computing environment and a basic computing device that may provide the user interface and the graphics creation and editing system as described herein.

FIG. 1 and the following discussion are intended to provide a brief, general description of a suitable computing environment in which the disclosed methods and computer storage media may be implemented. Although not required, the methods, systems, and computer storage media will be described in the general context of computer-executable instructions, such as program modules, being executed by a computing system, such as a personal computer. Generally, program modules include routines, programs, objects, components, and the like that perform particular tasks or implement particular abstract data types. Moreover, the disclosed methods and computer storage media may be practiced with other computing system configurations, including hand-held devices, multiprocessor systems, microprocessor-based or programmable consumer electronics, network personal computers, mini-computers, mainframe computers, and the like. The methods may also be practiced in distributed computing environments where tasks are performed by remote processing devices that are linked through a communications network. In a distributed computing environment, program modules may be located in both local and remote memory storage devices.

Referring now to FIG. 1, a suitable computing environment for implementing the disclosed embodiments includes a computing system 20 comprising a processing unit 21, a system memory 22, and a system bus 23, which couples various system components including the system memory 22 to the processing unit 21. The system bus 23 may be any of several types of bus structures including a memory bus, or memory controller; a peripheral bus; and a local bus using any of a variety of bus architectures.

Preferably, the system memory includes read only memory (ROM) 24 and random access memory (RAM) 25. A basic input/output system 26 (BIOS), containing the basic routine that helps to transfer information between elements such as during start-up, is stored in the ROM 24. The computing system 20 may further include a secondary storage device, such as a hard disk drive 27, for reading from and writing to an associated hard disk (not shown), a magnetic disk drive 28, for reading from or writing to a removable magnetic disk 29, and an optical disk drive 30, for reading from or writing to a removable optical disk 31, such as a compact disk (CD) ROM, digital video disk (DVD) ROM, or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer storage media provide nonvolatile, non-transitory storage of computer-readable instructions, data structures, program modules, and other data for the computing system 20. Although the exemplary environment described herein employs a hard disk associated with hard disk drive 27, a removable magnetic disk 29, and a removable optical disk 31, it should be appreciated by those skilled in the art that other types of computer storage media that can store data that is accessible by a computer, such as magnetic cassettes, flash memory cards, digital video disks, CDs, DVDs, random access memories (RAMs), read only memories (ROMs), and the like, may also be used in the exemplary operating environment.

A number of program modules may be stored on the hard disk associated with hard disk drive 27, magnetic disk 29, optical disk 31, ROM 24, or RAM 25, including an operating system 35, one or more application programs 36, other program modules 37, and program data 38. A user may enter commands and information into the computing system 20 having a user interface through input devices, such as a keyboard 40 and a pointing device 42, such as a mouse.

The computing system 20 might also include a camera 55, such as a digital/electronic still or video camera, or film/photographic scanner, capable of capturing a sequence of images 56. The images 56 are input into the computing system 20 via an appropriate camera interface 57. This camera interface 57 is connected to the system bus 23, thereby allowing the images to be routed to and stored in the RAM 25, or one of the other data storage devices associated with the computing system 20. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A display device, such as monitor 47, is also connected to the system bus 23 via an interface, such as a video adapter 48. In addition to the monitor, personal computers typically include other peripheral output devices (not shown), such as speakers and printers.

The computing system 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computing system 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the computing system 20 is connected to the local area network 51 through a network interface or adapter 53. When used in a WAN networking environment, the computing system 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computing system 20, or portions thereof, may be stored in the remote memory storage device. It will be appreciated that the network connections shown are exemplary and other means of establishing a communications link between the computers may be used.

Figure 2:
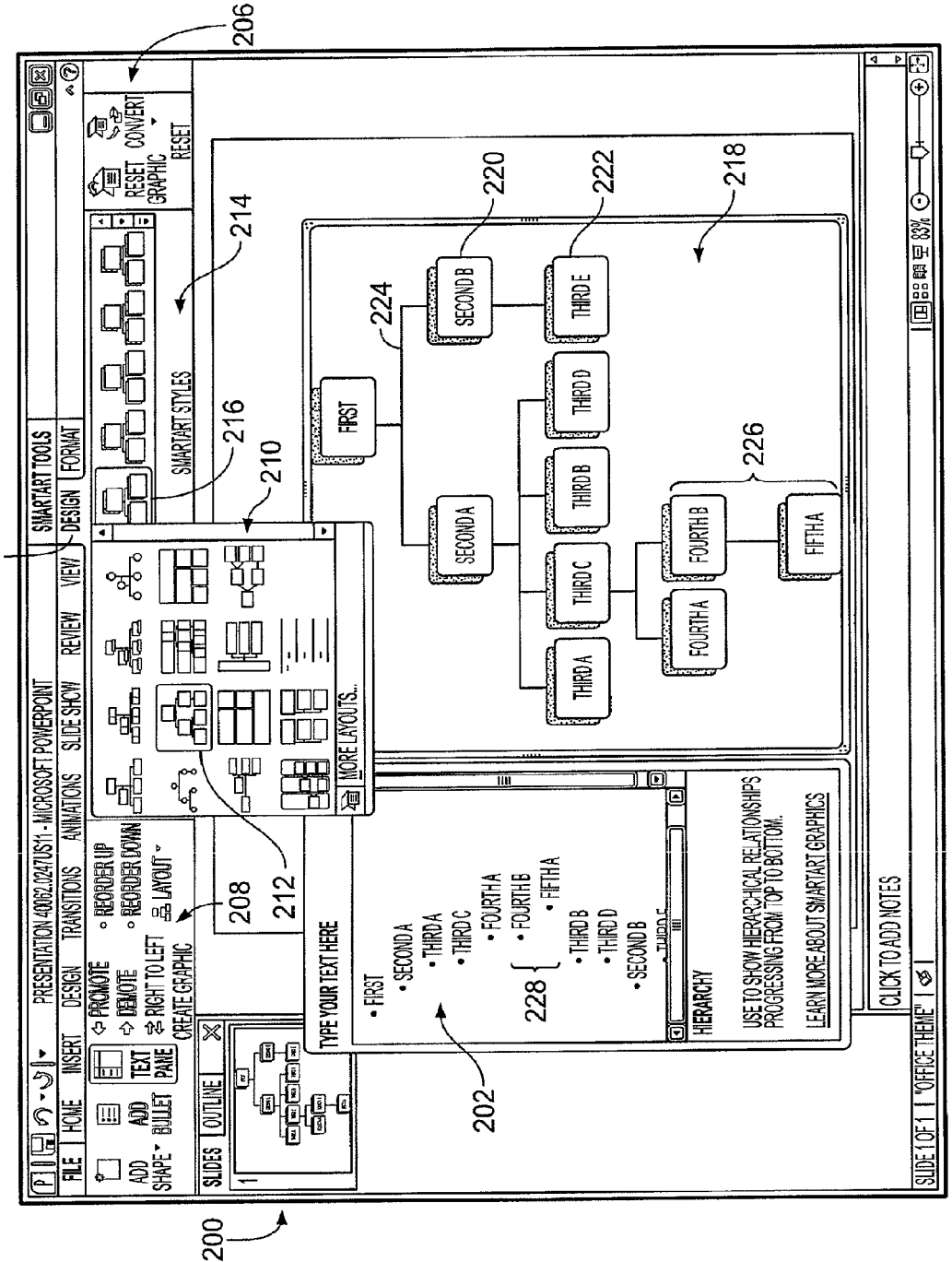
FIG. 2 is an illustration of an embodiment of a user interface for creating and editing graphical content.

FIG. 2 is an illustration of an embodiment of a user interface 200 for creating and editing graphical content.

As depicted in FIG. 2, a user interface 200 may be provided via execution of one or more computer-executable instructions by processing unit 21, the one or more computer-executable instructions may be stored on system memory 22 (including ROM 24 and RAM 25) or other forms of computer storage media (e.g., the hard disk associated with hard disk drive 27, magnetic disk 29, optical disk 31, etc.), as described above. User interface 200 may be displayed on monitor 47, for example, and may include a plurality of windows, display and/or entry panes, tabs, ribbons, menus, drop-down menus, and other useful interactive displays for providing input and/or commands to a computer system. As described above, inputs and/or commands may be used to easily create and edit graphical content within the disclosed computer graphics application.

For example, a content pane 202 may be provided within a window of the user interface 200 for accepting content. For purposes of this example, the window may be displayed upon executing the graphics application and beginning to build a single graphics presentation. Additionally, upon initiating various selections available within the window, different display and entry panes, ribbons, galleries, menus, etc., may be displayed for manipulating the single graphics presentation.

Content may generally refer to any underlying information intended for presentation in a graphical form. That is, the content may refer to the ideas, facts, details, results, statistics, evidence, images, instructions, etc., that one wishes to convey in a graphical presentation. In some embodiments, content may be textual, such as a hierarchical list of ideas or facts that have interrelationships. The content may convey information both via the text and via the formatting of the text, such as by carriage returns, tabs or indentions, line spaces, or other syntactic formats. In other embodiments, content may include information that is non-textual, such as images, videos, sounds, or other audio-visual media. However, even in cases where the content is non-textual, e.g., pictures, videos, etc., hierarchical formatting may be used to convey interrelationships within the content.

As noted above, in some embodiments, content may be provided in a hierarchical format, e.g., a hierarchical list of textual content. The hierarchical format may be provided through the use of carriage returns, indenting or tabbing, line spacing, etc. More specifically, the hierarchical format may include one or more hierarchical levels. A hierarchical level may refer to a line or layer of content in a hierarchical list. For example, with reference to content pane 202, a first hierarchical level of content in the illustrated hierarchical list includes a first line of textual content, i.e., the word "First." A second level of the hierarchical list may be created by using a carriage return and then indenting, or tabbing, and entering a second line of textual content, i.e., the words "Second A." Similarly, a third level of the hierarchical list may be created by using a carriage return and then indenting and entering a third line of textual content, i.e., the words "Third A." In the illustrated example, however, when the fourth line of text was entered, i.e., the words "Third C," a carriage return alone, without tabbing, was employed. As such, "Third C" falls directly below "Third A" within the hierarchical list, occupying the same hierarchical level, i.e., the third hierarchical level. Further, according to this example, when the textual content "Second B" was entered, a backspace or reverse tab was employed such that "Second B" is represented within the same hierarchical level as "Second A," i.e., the second hierarchical level.

In further embodiments of the hierarchical format, each line or layer of content within a hierarchical level may occupy a different hierarchical position. According to the example illustrated in content pane 202, "Second A," falling above "Second B" within the hierarchical list, may occupy a first hierarchical position, while "Second B" may occupy a second hierarchical position within the second hierarchical level.

Further still, relationships within the content may be represented by the hierarchical format. For example, again with reference to the hierarchical list illustrated in content pane 202, the use of various formatting may create parent/child relationships between lines of content. Specifically, entering "Third A" following a carriage return and indent beneath "Second A" may create a parent/child relationship between the two lines of content. That is, "Second A" may be parent content with respect to "Third A" child content. Practically speaking, one may wish to make a general assertion, statement, etc., and then support that statement with various facts or evidence. In that case, the general assertion may be entered as "parent" content, while the one or more supporting facts may be entered as "child" content.

According to other embodiments, the hierarchical format may be provided as a hierarchy of non-textual content. For example, the hierarchical format may be provided by inserting images, or other non-textual content, within different layers of a hierarchy. That is, through the use of various formatting, e.g., a carriage return, a second image may be inserted into the hierarchy in a layer directly below a first image, thereby producing images within a same hierarchical level of the hierarchy. For example, the first and second images may both occupy a second hierarchical level. Further, according to this embodiment, the first image may occupy a first hierarchical position and the second image may occupy a second hierarchical position within the second hierarchical level. Alternatively, the second image may be inserted into the hierarchy below the first image in an off-set fashion, e.g., via a tab, indention, backspace, reverse tab, etc. When the second image is inserted using a tab below the first image, a parent/child relationship may be created, i.e., the second image may be a child of the first image. In keeping with the above example, the first image may be represented in the second hierarchical level, as above, and the second image may be represented in a next or third hierarchical level. Alternatively, when the second image is inserted using a backspace or reverse tab under the first image, the second image may be represented in still another hierarchical level. That is, according to the above example, the second image may occupy a first hierarchical level, while the first image remains in the second hierarchical level. Indeed, any number of suitable variations may be employed for providing the content in a hierarchical format within the content pane 202.

In addition to content pane 202, a design tab 204 may be provided within the user interface. Upon selection of design tab 204, any number of galleries, control elements, drop-down menus, etc., may be provided in a ribbon, for example ribbon 206, within the window of the user interface. For instance, ribbon 206 may provide galleries, menus, etc., for displaying a plurality of graphical definitions that may be selected and applied to the content for graphically displaying or presenting the content. Additionally, control or command elements may be provided for selecting and applying various operations to the content, e.g., for creating, editing, rearranging, or otherwise modifying the content and the graphical content.

Ribbon 206 may be provided in any suitable area of the user interface 200 window. That is, ribbon 206 may be provided along an upper border, a lower border, a side panel, or in any other suitable location, to facilitate convenient access to displayed selections and/or controls. As noted above, ribbon 206 may provide one or more control or command elements for manipulating the content and the graphical content, e.g., control elements 208 (including promote, demote, right to left, reorder up, reorder down, etc.), as described further herein. Ribbon 206 may also include one or more galleries and/or menus for displaying a plurality of graphical definitions that may be applied to the content.

The plurality of graphical definitions may enable creation or modification of a visual appearance of the content, including a layout and a style of the content. As described above, each graphical definition comprises a combination of a layout definition and a style definition. For instance, upon selection of a layout definition from a layout gallery, the selected layout definition may be combined with a default style definition and may be applied to the content to create graphical content. Alternatively, upon selection of a layout definition, one or more style definitions may be presented for selection in a style gallery and, upon selection of one of the one or more style definitions, the selected layout definition and the selected style definition may be applied to the content to create the graphical content. Thus, when a graphical definition (i.e., a layout definition combined with a style definition) is applied to the content, graphical content is created.

More specifically, each graphical definition may determine one or more visual characteristics of the graphical content. For instance, a graphical definition may include information regarding geometric attributes including an arrangement of graphical elements within the graphical content (i.e., layout definition) and regarding design attributes of graphical elements within the graphical content (i.e., style definition).

A graphical element, also referred to as an element, refers to a part or portion of the displayed graphical content. According to some embodiments, graphical elements may include, but are not limited to, nodes, transitions, callouts, or Stuff On Page (SOP), such as clipart, photographs, or images. A node may be one of the shapes within the graphical content. Examples of nodes may include circles, squares, triangles, or parts of shapes, like segments. One skilled in the art will recognize many different types of nodes. A transition may be a graphical representation of an interrelationship between nodes. Transitions may include lines, arrows, or any other suitable indicator of a relationship between nodes.

Again, with reference to the plurality of graphical definitions above, a layout definition may determine a position, size, organization, arrangement, or other layout properties for the graphical elements. A style definition provides information regarding design properties for the graphical elements. For example, design properties may determine visual characteristics of the graphical elements, such as three dimensional (3D) rendering, rotation, shape, border line, glow, shadow, bevel, fill, etc., for displaying the nodes or transitions. In some embodiments, design properties may include a font size, font type, font color, etc., for displaying content within nodes or transitions of the graphical content. In other embodiments, format properties may determine the font size, font type, font color, etc., of content within elements of the graphical content.

According to embodiments of the present disclosure, a hierarchical structure of the graphical content may directly correlate with the hierarchical format of the content. The hierarchical structure refers to a number, type, and organization of graphical elements within the graphical content. The number of graphical elements within the graphical content may correlate with the number of layers or lines of the hierarchical format. The type of graphical element may correlate with each layer or line of content (i.e., a node type element) and/or with each format that indicates a relationship within the content (i.e., a transition type element). The organization of the graphical elements may correlate with relationships within the content, that is, each hierarchical level of content may correlate with an organizational level of graphical elements, e.g., node level. Further, each hierarchical position within a hierarchical level of content may correlate with an order of graphical elements within an organizational level, e.g., node position within node level. Parent/child relationships within the graphical content may be represented by child nodes associated with parent nodes. As described above with reference to parent/child relationships within the content, a child node may be displayed as associated with a parent node, e.g., via a transition connection, and may be displayed within an organizational level, e.g., node level, below the parent's organizational level.

As should be appreciated, application of a graphical definition to the above described hierarchical structure may alter the layout and style of graphical elements within the hierarchical structure, but may not alter the underlying relationships of the hierarchical structure.

Indeed, embodiments may provide for effortless selection and application of one or more graphical definitions to the content without recreating or modifying the content. That is, present embodiments provide for automatic creation of graphical content based on combining one or more selected graphical definitions with the content.

Referring now to layout drop-down menu 210, a plurality of layout definitions may be displayed for selection. Selection of a layout definition may be accomplished via clicking, touching, or otherwise activating one of the displayed layouts, e.g., layout 212. Upon selection of layout 212, the layout definition associated with layout 212 may be applied to the content to create the graphical content. That is, upon selection of layout 212, the content may be displayed in the content pane 202 and the graphical content may be substantially simultaneously displayed in the graphics pane 218.

According to some embodiments, as the content is entered in the content pane 202, a default graphical definition may be applied to the content such that the graphical content is automatically and substantially simultaneously displayed in graphics pane 218 as the content is entered in content pane 202. A default graphical definition may refer to the combination of a default layout and a default style. According to other embodiments, selection of a graphical definition may be requested before the graphical content is displayed in graphics pane 218. According to further embodiments, graphical content may be entered directly into graphics pane 218 (based on a default or a selected graphical definition) and content (including any formatting corresponding to relationships of the entered graphical content) may be substantially simultaneously displayed in content pane 202.

In addition, upon selection of layout 212, style gallery 214 may display a plurality of style definitions applicable to selected layout 212. For instance, style gallery 214 may display one or more style definitions for altering the visual characteristics of graphical elements within selected layout 212, e.g., 3D rendering, rotation, shape, border line, glow, shadow, bevel, fill, etc., of the layout elements. Note that if a new layout is selected from layout drop-down menu 210, a plurality of different style definitions, applicable to the new selected layout, may be displayed in style gallery 214.

With reference to selected layout 212, upon selection of a style definition, e.g., style definition 216, the visual characteristics of graphical elements in the graphical content may be automatically modified in graphics pane 218 based on selected style definition 216. In this embodiment, that is, by selecting style definition 216 from style gallery 214, the selected style definition 216 is applied to all graphical elements (e.g., node 220, node 222, and transition 224) of the graphical content. In alternative embodiments, described in more detail below, nodes (e.g., nodes 220 and 222) may be individually customized via shape customizing or other menus.

The user interface 200 of the graphics application may also provide graphics pane 218. Graphics pane 218 may be provided in a separate area from ribbon 206, ribbon 206 including its associated control elements (e.g., control elements 208), galleries (e.g., style gallery 214), and drop-down menus (e.g., layout drop-down menu 210). Graphics pane 218 may also be provided in a separate area from content pane 202. Graphics pane 218 may display the graphical content, which is a combination of a graphical definition and the content. As described above, graphical content may include one or more graphical elements, including nodes (e.g., nodes 220 and 222) and transitions (e.g., transition 224).

According to embodiments of the present disclosure, graphical content may be automatically displayed in graphics pane 218 as content is entered and/or manipulated in content pane 202. For example, as a portion of content (e.g., line of text, image, etc.) is entered in the content pane 202, a corresponding graphical element (e.g., node 220) may be created within graphics pane 218. In addition, according to this embodiment, the line of text (i.e., "Second B") is also reproduced in node 220. Additionally, upon applying formatting to the content in content pane 202, relationships within the content may be created. That is, a first portion of content (e.g., first line of text) may be entered within a first hierarchical level of the content. Thereafter, a second portion of content (e.g., second line of text) may be entered after a carriage return and an indention, or tab. The second line of text may occupy a second hierarchical level and be a child of the first line of text. When the content is reproduced as the graphical content in the graphics pane, the first line of text may correspond to a first node, e.g., node 220, and the second line of text may correspond to a second node, e.g., node 222, which is a child element of node 220. Thus, corresponding parent/child relationships may be represented in the graphical content (e.g., parent/child relationship 226) and in the content (e.g., parent/child relationship 228).

According to embodiments of the present disclosure, the position of display for a graphical element may depend on the layout definition, e.g., selected layout 212. For instance, a line of content on the highest hierarchical level within the content may be at the bottom of some graphical content layouts and at the top of other graphical content layouts. Additionally or alternatively, a higher position within a hierarchical level, i.e., a first hierarchical position directly above a second hierarchical position within a hierarchical level, may be represented as a first node on the left of a second node, a first node to the right of a second node, a first node above a second node, or a first node below a second node. Note that in each case, the first and second nodes are adjacent to one another within the graphical content. However, depending on the selected layout, the relative orientation of the first and second nodes may be different. This concept will be discussed further below with respect to additional illustrative figures.

Figure 3:
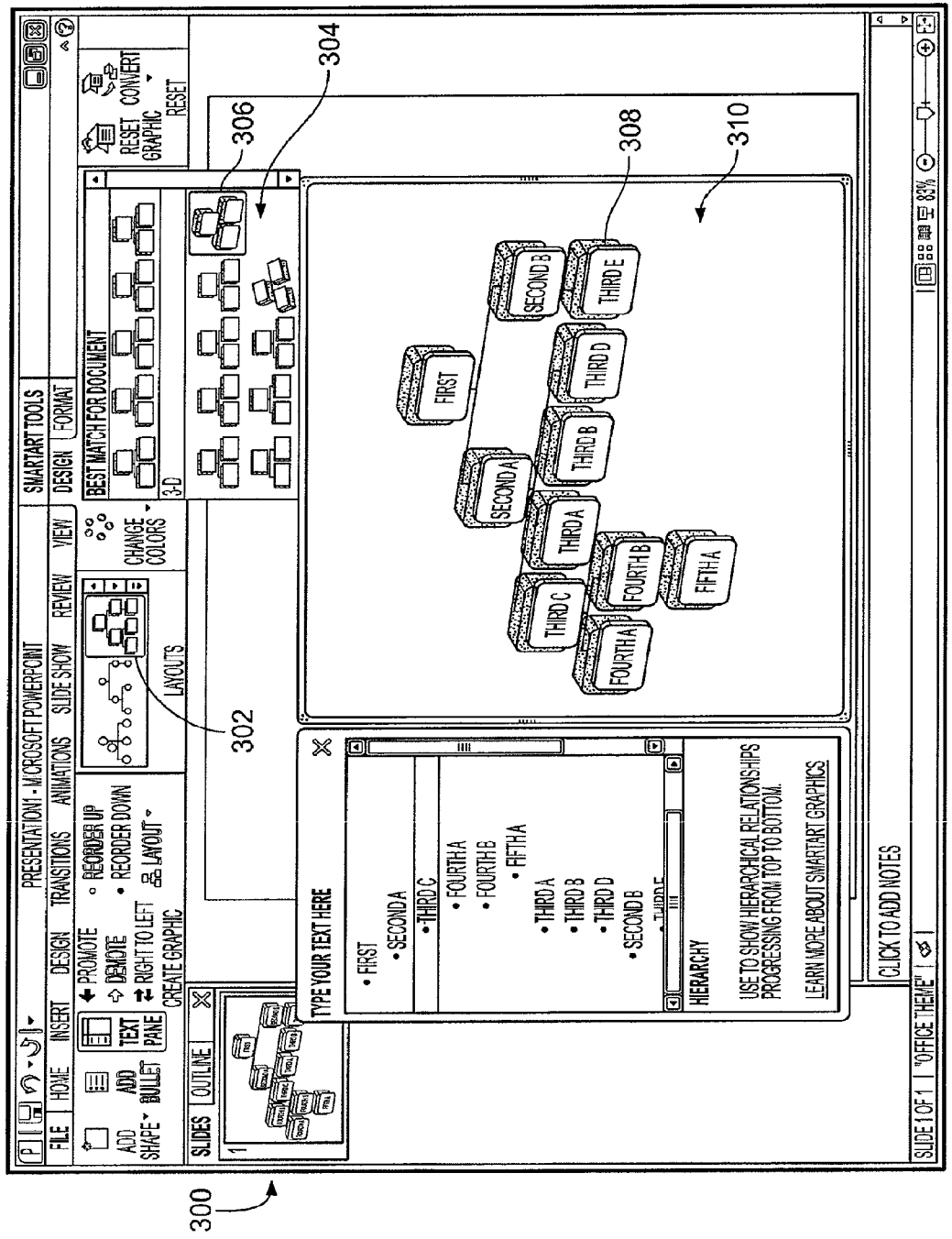
FIG. 3 is an illustration of an embodiment of a user interface providing a style drop-down menu associated with a style gallery for selecting additional style definitions applicable to a selected layout.

FIG. 3 is an illustration of an embodiment of a user interface providing a style drop-down menu associated with a style gallery for selecting additional style definitions applicable to a selected layout.

As depicted in FIG. 3, a user interface 300 may be provided via execution of one or more computer-executable instructions by processing unit 21, the one or more computer-executable instructions may be stored on system memory 22 (including ROM 24 and RAM 25) or other forms of computer storage media (e.g., the hard disk associated with hard disk drive 27, magnetic disk 29, optical disk 31, etc.), as described above.

As illustrated in FIG. 2, above, upon selecting a layout, e.g., selected layout 212, a style gallery may present a plurality of style definitions that may be selected and applied to the selected layout, e.g., style gallery 214.

As illustrated in FIG. 3, upon selection of a layout, e.g., selected layout 302, a style drop-down menu 304 may be provided. Style drop-down menu 304 may display a plurality of additional style definitions for altering the visual characteristics of graphical elements within selected layout 302. Similar to the plurality of style definitions of the style gallery, the plurality of additional style definitions may alter a 3D rendering, rotation, shape, border line, glow, shadow, bevel, fill, etc., of graphical elements within the selected layout 302. Note that if a new layout is selected, as described above, a different plurality of additional style definitions, applicable to the new selected layout, may be displayed in style drop-down menu 304.

Upon selection of an additional style definition, e.g., additional style definition 306, the visual characteristics of graphical elements in the graphical content may be automatically modified in graphics pane 310. As such, graphical content 308 is displayed in a rotated, three-dimensional (3D) representation based on selection of additional style definition 306. According to the illustrated embodiment, visual characteristics associated with additional style definition 306 are applied to all graphical elements of the graphical content 308.

Figure 4:
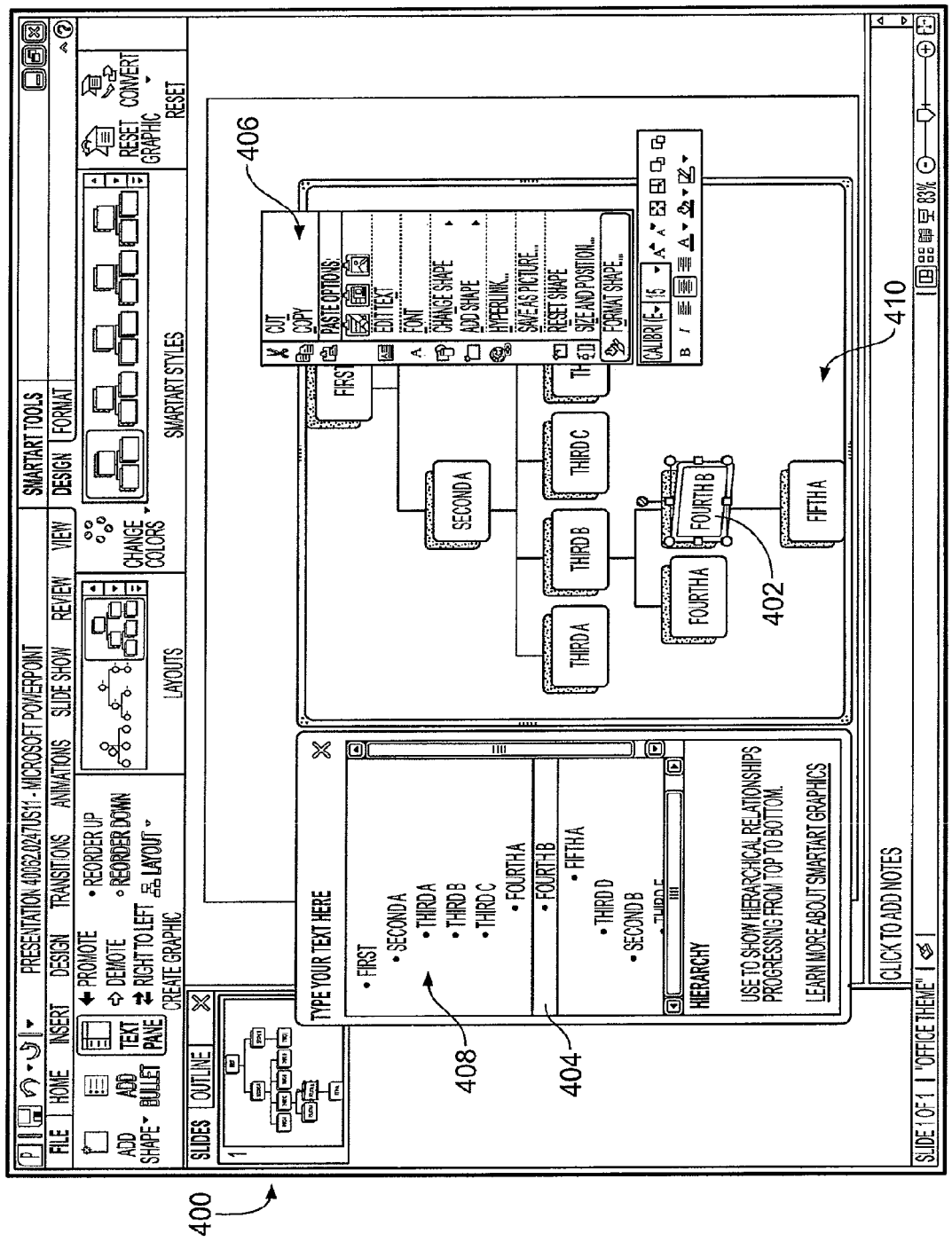
FIG. 4 is an illustration of an embodiment of a user interface providing a shape customizing drop-down menu associated with a graphical element of the graphical content.

FIG. 4 is an illustration of an embodiment of a user interface providing a shape customizing drop-down menu associated with a graphical element of the graphical content.

As depicted in FIG. 4, a user interface 400 may be provided via execution of one or more computer-executable instructions by processing unit 21, the one or more computer-executable instructions may be stored on system memory 22 (including ROM 24 and RAM 25) or other forms of computer storage media (e.g., the hard disk associated with hard disk drive 27, magnetic disk 29, optical disk 31, etc.), as described above.

According to some embodiments, one or more graphical elements of the graphical content may be independently customized with one or more style definitions. That is, a graphical element may be selected in graphics pane 410, via clicking, touching, or otherwise activating the graphical element. As illustrated, node 402 has been selected or activated, as evidenced by a focus graphic surrounding node 402. Additionally, a corresponding line of content 404, i.e., "Fourth B," is identified as activated in content pane 408, e.g., evidenced by a focus box surrounding the corresponding line of content 404.

Upon activating node 402, a shape customizing drop-down menu 406 may be initiated. Specifically, the shape customizing drop-down menu 406 may be initiated via left or right click, or any other suitable means for initiating.

The shape customizing drop-down menu 406 may provide a plurality of options for customizing the node 402. These options may be similar to the style definitions described above, but may be applied to a single graphical element at a time. The plurality of options may include, inter alia, options for formatting, resetting, resizing, repositioning, rotating, filling, and editing content for a selected graphical element. Additionally or alternatively, upon selection of an option of the shape customizing drop-down menu 406, additional menus providing sub-options associated with the selected option may be provided.

As illustrated in FIG. 4, upon selecting one or more options and/or sub-options for customizing node 402, node 402 is depicted with a customized fill, bevel, and rotation. As may be appreciated, information or content presented in a particular graphical element may be especially important to a presentation. As such, a particular graphical element may be customized to highlight or bring attention to the particular information conveyed by that graphical element within the graphical content.

Figure 5:
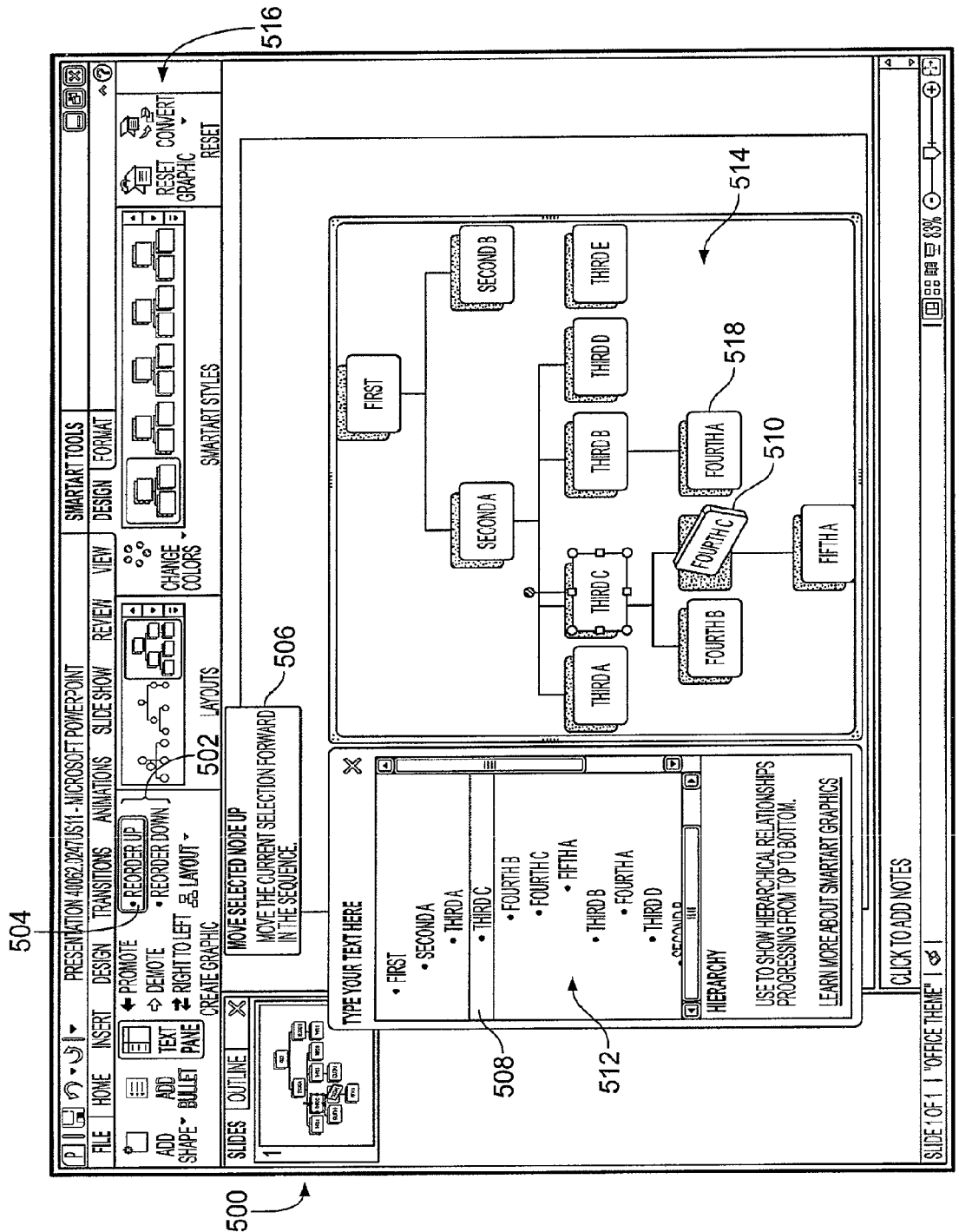
FIG. 5 is an illustration of an embodiment of a user interface providing one or more control elements for modifying the content and the graphical content.

FIG. 5 is an illustration of an embodiment of a user interface providing one or more control elements for modifying the content and the graphical content.

A user interface 500 may be provided via execution of one or more computer-executable instructions by processing unit 21, the one or more computer-executable instructions may be stored on system memory 22 (including ROM 24 and RAM 25) or other forms of computer storage media (e.g., the hard disk associated with hard disk drive 27, magnetic disk 29, optical disk 31, etc.), as described above.

As described above, control elements may be selected via user interface 500 to apply various operations to the content and to the graphical content, e.g., for creating, editing, rearranging, or otherwise modifying the content and the graphical content. Specifically, reorder control elements 502 may be provided for reordering the hierarchical format of the content and the hierarchical structure of the graphical content.

As may be appreciated, changes made to the hierarchical format of the content may be automatically and substantially simultaneously reflected as corresponding changes to the hierarchical structure of the graphical content. For instance, if a content portion (e.g., a line of content or an image) is re-positioned within a first hierarchical level, e.g., reordered from a second hierarchical position to a first hierarchical position within the first hierarchical level, a corresponding change may occur within the graphical content. That is, a node occupying a second node position within a first node level may be reordered to a first node position within the first node level.

According to at least some embodiments, a hierarchical position of the content may contain a portion of content, e.g., a line of text or an image, as described above. A node corresponding to the portion of content may comprise a combination of the portion of content (i.e., the line of text or the image), attributes of the graphical definition as applied to the content (i.e., layout and style properties applied to the content), and any additional customizations to the node (as described further herein). Thus, when the portion of content is reordered from one hierarchical position to another in content pane 512, the corresponding node (including the portion of content, the applied graphical definition, and any customizations) is reordered from one node position to another in graphics pane 514.

As described above, control elements may be provided within a ribbon area, e.g., ribbon 516, of user interface 500. More specifically, reorder control elements 502 may include a reorder up element 504 (activated) and a reorder down element (not activated). Additionally, according to some embodiments, upon initiating one of the reorder control elements 502, a text box may be displayed providing information regarding the initiated control element. For example, upon initiation of reorder up element 504, a reorder up text box 506 may be displayed. Reorder up text box 506 may further provide that upon selection of the reorder up control element, a node may be moved forward in the sequence. That is, upon selection of a node and initiation of reorder up element 504, the selected node may be move up one node position within an associated node level. Likewise, a selected line of content corresponding to the selected node may be moved up one hierarchical position within a corresponding hierarchical level. A similar text box may be displayed upon selection of the reorder down element (text box not shown).

For example, as illustrated in FIG. 5, line of text 508 (i.e., "Third C") is selected in content pane 512, as evidenced by the focus box surrounding line of text 508. Upon selecting or otherwise initiating the reorder up element 504, line of text 508 may be moved up one hierarchical position within the third hierarchical level (as shown). That is, the "Third C"

line of text has been moved above the "Third B" line of text within the third hierarchical level. Likewise, as illustrated in graphics pane 514, node "Third C" has been moved one node position to the left, reordering node "Third C" from a third node position to a second node position within the third node level. Consequently, node "Third B" has been reordered from a second node position to a third node position within the third node level.

In addition, according to the illustrated embodiment, node "Third C" is associated with two child nodes, i.e., node "Fourth B" and node "Fourth C" (i.e., node 510). Further, node "Fourth C" (i.e., node 510) is also associated with a child node, i.e., node "Fifth A." For purposes of illustration within FIG. 5 only, node "Third B" has been associated with a child node "Fourth A" (i.e., node 518), while node "Fourth B" and node "Fourth C" (i.e., node 510) are associated with node "Third C." For previous and subsequent figures, node "Third C" is associated with nodes "Fourth A" and "Fourth B." FIG. 5 illustrates that, according to at least some embodiments, upon reordering a parent node, child nodes remain associated with the parent node and are also reordered within the hierarchical structure. Thus, upon reordering node "Third C," nodes "Fourth B" and "Fourth C" remain in a child relationship with node "Third C." Additionally, nodes "Fourth B" and "Fourth C" are reordered within the fourth hierarchical level. That is, nodes "Fourth B" and "Fourth C" are also moved one node position to the left, reordering node "Fourth B" from a second node position to a first node position within the fourth node level and reordering node "Fourth C" from a third node position to a second node position within the fourth node level. Consequently, node "Fourth A" (i.e., node 518), associated with node "Third B," has been reordered from a first node position to a third node position in the fourth node level. Note that according to this embodiment, multiple child nodes associated with a single parent node remain in adjacent positions to one another when the parent node is reordered, which may cause child nodes associated with other parent nodes to be reordered by more than one node position within a node level (as illustrated).

As should be appreciated, corresponding changes occur within content pane 512. That is, line of text "Third C" (i.e., line of text 508) has been moved up one hierarchical position, to the second hierarchical position, along with child lines of text "Fourth B" and "Fourth C." Child lines of text have also been moved up one hierarchical position, respectively, within the fourth hierarchical level. Consequently, line of text "Third B" has been moved down one hierarchical position, to the third hierarchical position, within the third hierarchical level. In addition, child line of text "Fourth A" has been moved down two hierarchical positions, to a third hierarchical position within the fourth hierarchical level.

Additionally or alternatively, as illustrated by FIG. 5, node "Fourth C" (i.e., node 510) has been independently customized, as described above. According to the illustrated embodiment, upon reordering node "Fourth C" (i.e., node 510), the customization has been retained. According to other embodiments, based on a selected graphical definition, customization may not be retained upon reordering. For example, if a selected layout associates a particular shape with a particular node position, this association may be retained when a node or shape is reordered. That is, according to one embodiment, a selected layout may designate a first node position within a node level as a square, a second node position as a circle, and a third node position as a triangle. Upon customizing a node occupying a second node position, the node may be customized to a square. Thus, before reordering, the nodes may be represented as: a square, a square, and a triangle, respectively. However, upon reordering, the layout definition may control. That is, if the second node, a customized square, is reordered to the third position, it may automatically revert to a triangle based on the selected layout definition for the graphical content. According to other embodiments, customized nodes may retain some aspects of customization when reordered, e.g., font type, color, fill, etc., but may not retain others, e.g., node shape, style, rotation, etc.

Figure 6:
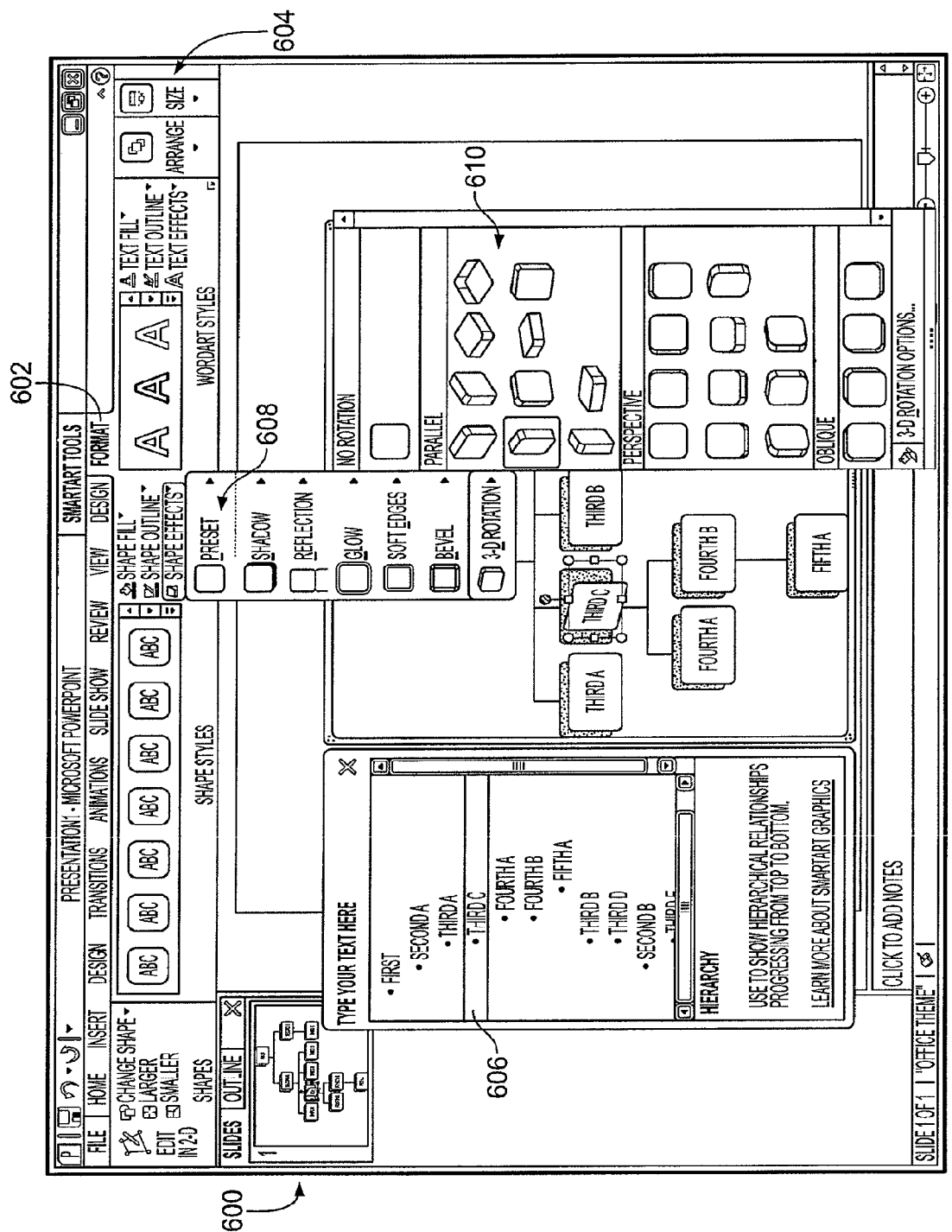
FIG. 6 is an illustration of an embodiment of a user interface providing a shape effects drop-down menu associated with a format tab.

FIG. 6 is an illustration of an embodiment of a user interface providing a shape effects drop-down menu associated with a format tab.

A user interface 600 may be provided via execution of one or more computer-executable instructions by processing unit 21, the one or more computer-executable instructions may be stored on system memory 22 (including ROM 24 and RAM 25) or other forms of computer storage media (e.g., the hard disk associated with hard disk drive 27, magnetic disk 29, optical disk 31, etc.), as described above.

According to some embodiments, a format tab, e.g., format tab 602, may be provided within the user interface 600. Upon selection of format tab 602, any number of galleries, control elements, drop-down menus, etc., may be provided in a ribbon, for example ribbon 604, within the window of the user interface 600. For instance, galleries, menus, etc., may be provided for displaying a plurality of formatting options that may be selected and applied to the graphical content. Additionally, control or command elements may be provided for selecting and applying various operations to the graphical content, e.g., for changing shapes, enlarging shapes, etc. As may be appreciated, the galleries, menus, and control elements provided within ribbon 604 (associated with format tab 602) are different from those displayed in ribbon 206 (associated with design tab 204), described above.

For example, one may select a shape effects drop-down menu 608 from within ribbon 604. Within shape effects drop-down menu 608, drop-down sub-menus may be selected, e.g., 3-D rotation drop-down sub-menu 610. As may be appreciated, similar to employing the shape customizing drop-down menu 406, a selected node (e.g., node "Third C" corresponding to selected line of content 606) may be independently customized by using one or more shape effects menus and sub-menus.

Figure 7:
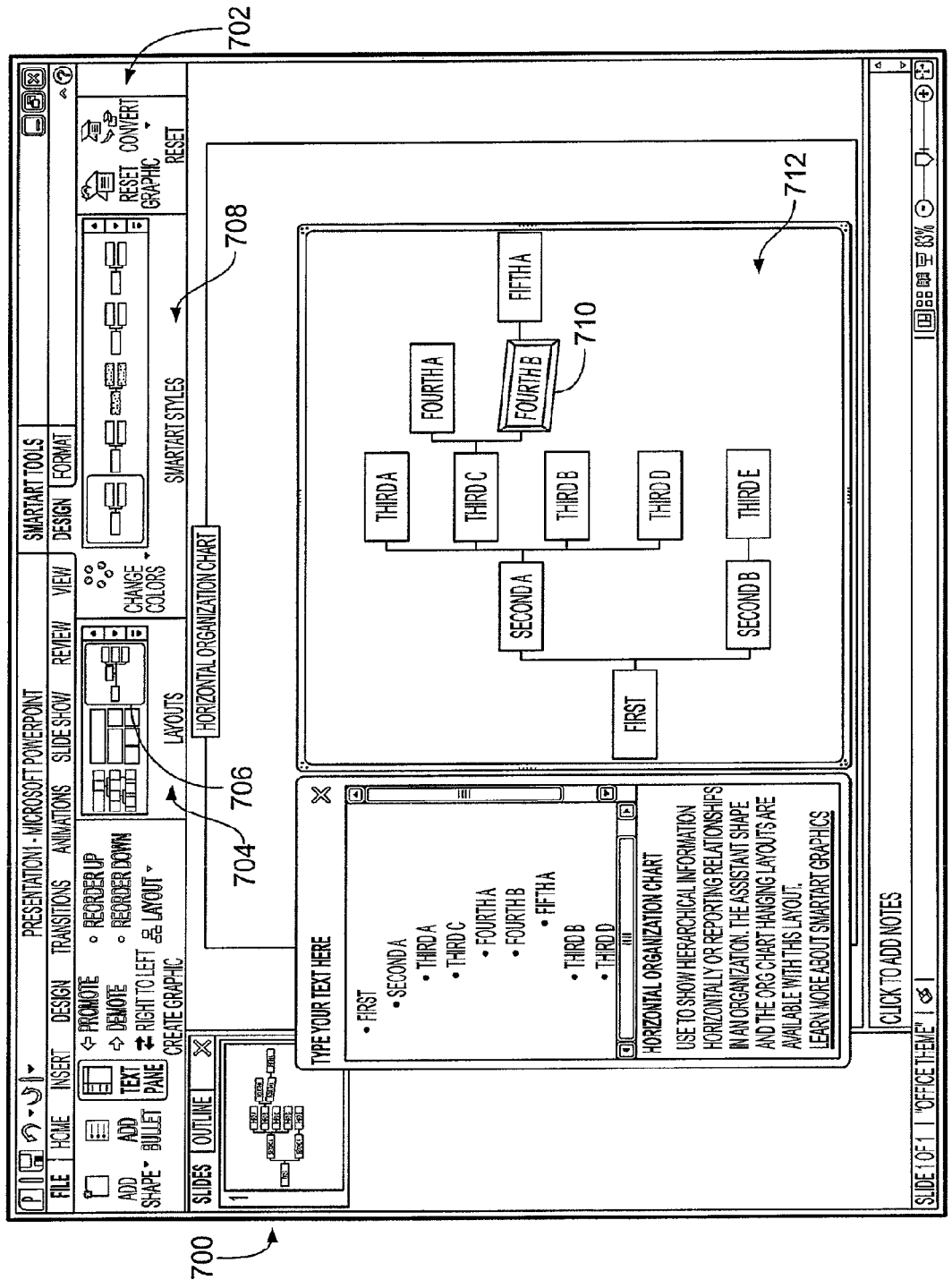
FIG. 7 is an illustration of an embodiment of a user interface illustrating application of a first alternative layout definition to the graphical content.

FIG. 7 is an illustration of an embodiment of a user interface illustrating application of a first alternative layout definition to the graphical content.

A user interface 700 may be provided via execution of one or more computer-executable instructions by processing unit 21, the one or more computer-executable instructions may be stored on system memory 22 (including ROM 24 and RAM 25) or other forms of computer storage media (e.g., the hard disk associated with hard disk drive 27, magnetic disk 29, optical disk 31, etc.), as described above.

As described above, different graphical definitions may be applied to the content to produce different graphical content. As such, ribbon 702, similar to ribbon 206, may provide galleries, menus, and control elements for creating and/or editing the content and the graphical content. Specifically, ribbon 702 may provide a layout gallery 704. Layout gallery 704 may display a plurality of layout definitions for selection. Upon selection of a first alternative layout, e.g., first alternative layout 706, the layout definition associated with first alternative layout 706 may be substantially simultaneously applied to the content and displayed as the graphical content in graphics pane 712, as described above.

In addition, upon selection of first alternative layout 706, style gallery 708 may display a plurality of style definitions applicable to first alternative layout 706. As first alternative layout 706 is different from the selected layout 212, as described above, a plurality of different style definitions, applicable to first alternative layout 706, are displayed in style gallery 708.

With reference to first alternative layout 706, upon selection of a style definition, the visual characteristics of graphical elements in the graphical content may be automatically modified in graphics pane 712 based on first alternative layout 706. Note that the previously customized node, "Fourth B" (i.e., node 710), retained its customization even though first alternative layout 706 was selected. As described above, depending on a selected layout, customized nodes (such as customized node 710) may or may not retain customization after a new layout is selected.

Figure 8:
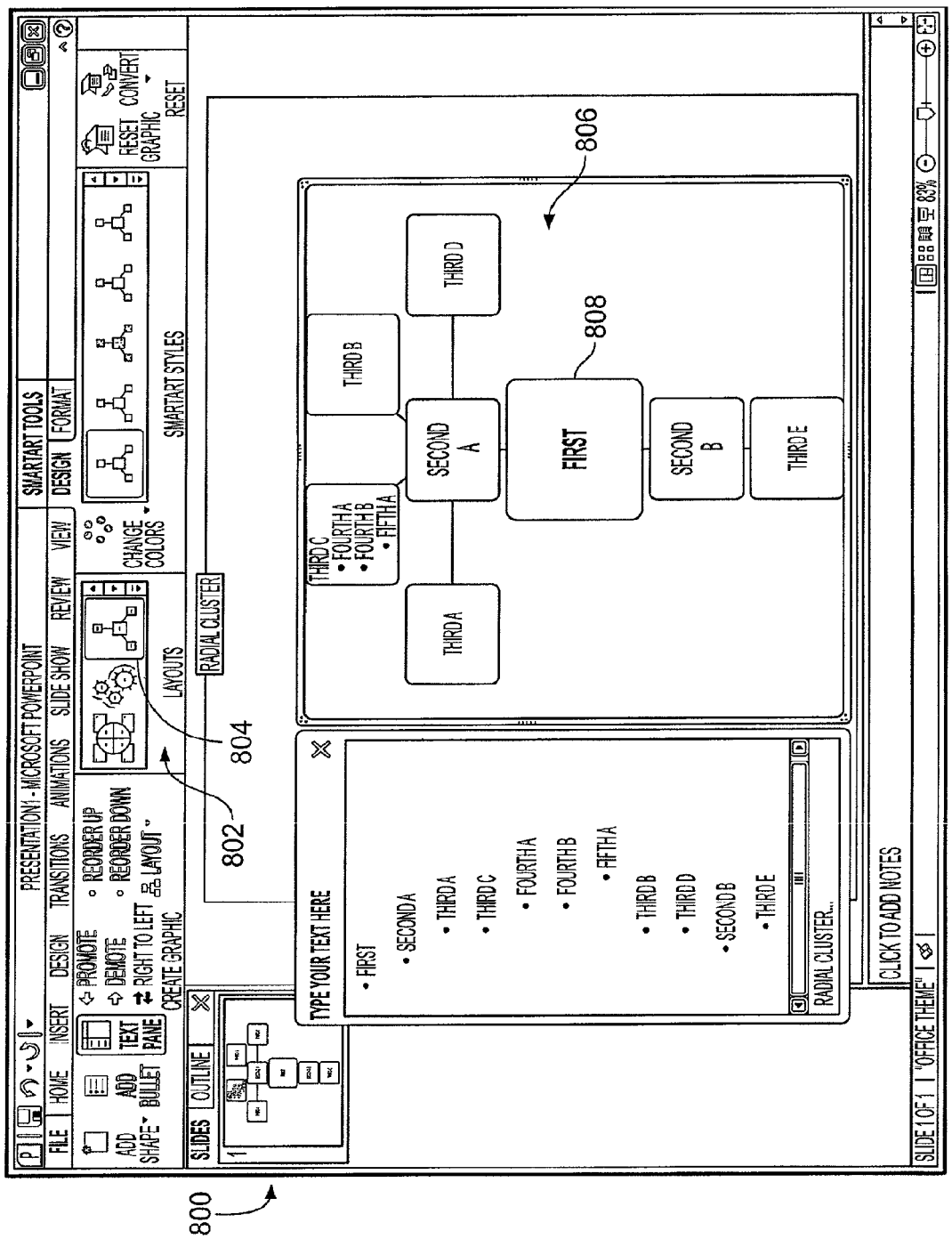
FIG. 8 is an illustration of an embodiment of a user interface illustrating application of a second alternative layout definition to the graphical content.

FIG. 8 is an illustration of an embodiment of a user interface illustrating application of a second alternative layout definition to the graphical content.

A user interface 800 may be provided via execution of one or more computer-executable instructions by processing unit 21, the one or more computer-executable instructions may be stored on system memory 22 (including ROM 24 and RAM 25) or other forms of computer storage media (e.g., the hard disk associated with hard disk drive 27, magnetic disk 29, optical disk 31, etc.), as described above.

Again, different graphical definitions may be applied to the content to produce different graphical content. According to the illustrated embodiment, layout gallery 802 may display a plurality of layout definitions for selection. Upon selection of a layout, e.g., second alternative layout 804, the layout definition associated with second alternative layout 804 may be automatically applied to the content and substantially simultaneously displayed as the graphical content 808 in the graphics pane 806, as described above. Additionally, as described above, a default style definition may be automatically applied to the content upon selection of second alternative layout 804. Additionally or alternatively, a style gallery may be presented upon selection of second alternative layout 804 and a style definition applicable to second alternative layout 804 may be selected and applied to the content.

As described above, upon selection of second alternative layout 804, the visual characteristics of graphical elements in the graphical content 808 may be automatically modified in the graphics pane 806 based on second alternative layout 804. However, note that according to this embodiment, the previously customized node, "Fourth B" (i.e., node 710, as illustrated in FIG. 7), did not retain its customization in the second alternative layout 804.

Figure 9:
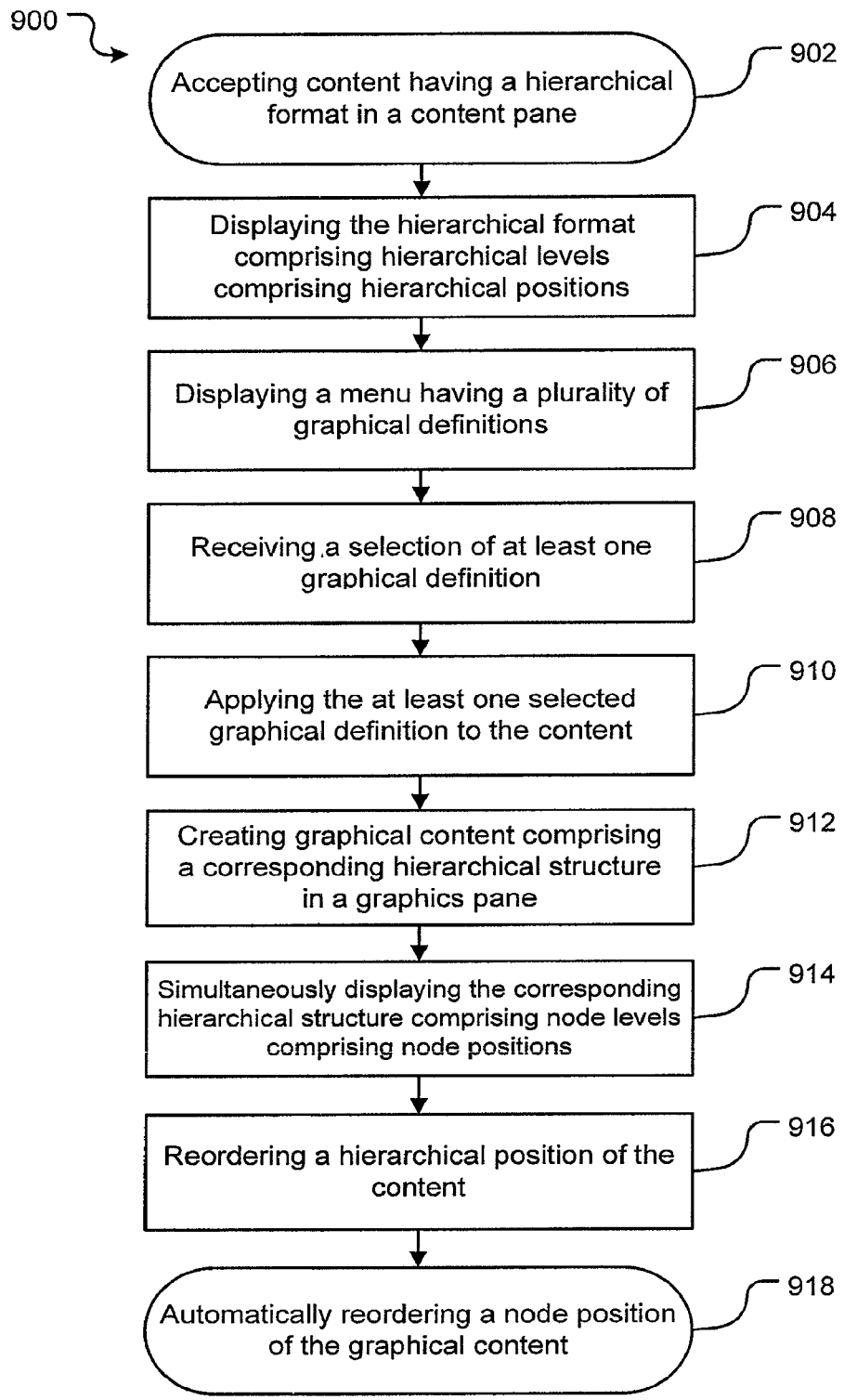
FIG. 9 is a flow diagram representing an embodiment of a method for reordering the hierarchical format of the content.

FIG. 9 is a flow diagram representing an embodiment of a method for reordering the hierarchical format of the content.

A flow operation 900 may be provided via execution of one or more computer-executable instructions by processing unit 21, the one or more computer-executable instructions may be stored on system memory 22 (including ROM 24 and RAM 25) or other forms of computer storage media (e.g., the hard disk associated with hard disk drive 27, magnetic disk 29, optical disk 31, etc.), as described above.

At accept content operation 902, content may be received in a content pane of a graphics application. As described above, the content may comprise a hierarchical format. The hierarchical format may be provided through the use of carriage returns, indenting or tabbing, line spacing, etc., as discussed in relation to FIGS. 2-8.

At display hierarchical format operation 904, the hierarchical format of the content may be displayed in the content pane. The hierarchical format may further comprise one or more hierarchical levels and each of the hierarchical levels may comprise a plurality of hierarchical positions.

At display menu operation 906, a menu displaying a plurality of graphical definitions may be provided. The graphical definitions may determine one or more visual characteristics of the graphical content. A graphical definition may refer to the combination of a layout (e.g., defining arrangement properties) and a style (e.g., defining design properties) applied to the graphical elements of the graphical content. The plurality of graphical definitions may be displayed in a ribbon, including one or more galleries and menus, in a separate area from the content pane and the graphics pane.

At receive selection operation 908, a selection of at least one graphical definition is received.

At apply operation 910, the selected at least one graphical definition is applied to the content.

At create operation 912, the graphical content is created by applying the selected at least one graphical definition to the hierarchical format of the content. In so doing, graphical content is created having a corresponding hierarchical structure.

At simultaneously display operation 914, the corresponding hierarchical structure of the graphical content is displayed in the graphics pane. The corresponding hierarchical structure may further comprise one or more node levels, corresponding to the one or more hierarchical levels of the content. Each node level may further comprise a plurality of nodes occupying a plurality of node positions, the node positions corresponding to the plurality of hierarchical positions of the content in the content pane. That is, each node (i.e., a portion of content having an applied graphical definition or customization, as described above) occupies a node position in a node level and corresponds to the portion of content occupying the corresponding hierarchical position in the corresponding hierarchical level.

At reorder operation 916, a hierarchical position within a hierarchical level of the hierarchical format may be reordered in the content pane. Reordering may be initiated automatically by selection of a portion of content in a hierarchical position of a hierarchical level and activation of a reorder control element or other suitable command. Any child portions of content associated with the selected portion of content may also be reordered within a child hierarchical level.

At automatically reorder operation 918, a node in a corresponding node position within a corresponding node level of the hierarchical structure of the graphical content may be automatically reordered and substantially simultaneously displayed in the graphics pane. Further, any child nodes associated with the node in the corresponding node position may also be automatically reordered. That is, the associated child nodes may also be automatically reordered within a child node level and substantially simultaneously displayed in the graphics pane.

Figure 10:
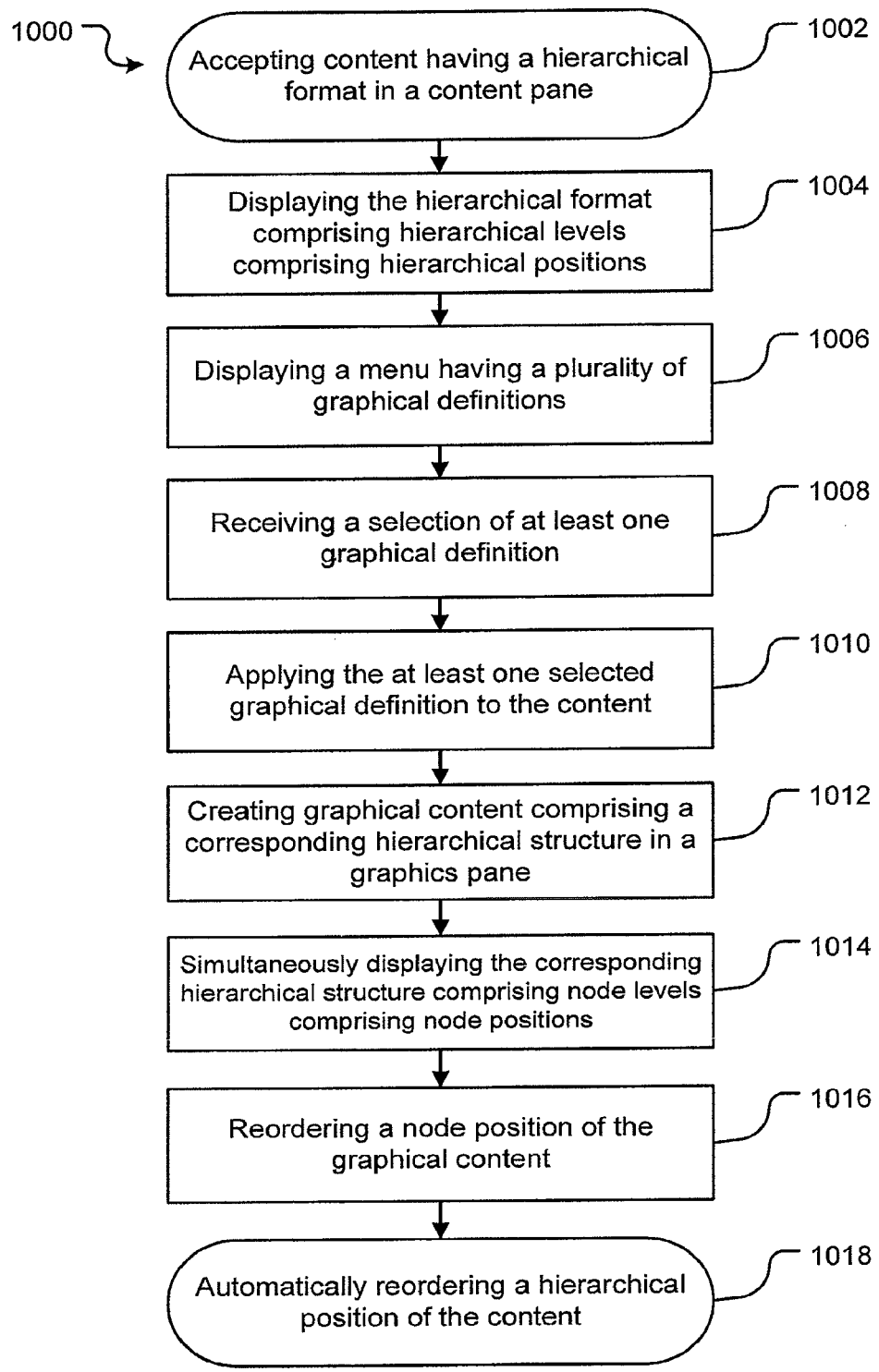
FIG. 10 is a flow diagram representing an embodiment of a method for reordering the hierarchical structure of the graphical content.

FIG. 10 is a flow diagram representing an embodiment of a method for reordering the hierarchical structure of the graphical content.

A flow operation 1000 may be provided via execution of one or more computer-executable instructions by processing unit 21, the one or more computer-executable instructions may be stored on system memory 22 (including ROM 24 and RAM 25) or other forms of computer storage media (e.g., the hard disk associated with hard disk drive 27, magnetic disk 29, optical disk 31, etc.), as described above.

At accept content operation 1002, content may be received in a content pane of a graphics application. As described above, the content may comprise a hierarchical format. The hierarchical format may be provided through the use of carriage returns, indenting or tabbing, line spacing, etc.

At display hierarchical format operation 1004, the hierarchical format of the content may be displayed in the content pane. The hierarchical format may further comprise one or more hierarchical levels and each of the hierarchical levels may comprise a plurality of hierarchical positions.

At display menu operation 1006, a menu displaying a plurality of graphical definitions may be displayed for selection. The graphical definitions may determine one or more visual characteristics of the graphical content. A graphical definition may refer to the combination of a layout definition (e.g., defining arrangement properties) and a style definition (e.g., defining design properties) of the graphical content. The plurality of graphical definitions may be displayed in a ribbon, including one or more galleries and menus, in a separate area from the content pane and the graphics pane.

At receive selection operation 1008, a selection of at least one graphical definition is received.

At apply operation 1010, the selected at least one graphical definition is applied to the content.

At create operation 1012, the graphical content is created by applying the selected at least one graphical definition to the hierarchical format of the content. In so doing, graphical content is created having a corresponding hierarchical structure.

At simultaneously display operation 1014, the corresponding hierarchical structure of the graphical content is displayed in the graphics pane. The corresponding hierarchical structure may further comprise one or more node levels, corresponding to the one or more hierarchical levels of the content. Each node level may further comprise a plurality of nodes occupying a plurality of node positions, the node positions corresponding to the plurality of hierarchical positions of the content in the content pane. That is, each node (i.e., a portion of content having an applied graphical definition or customization, as described above) occupies a node position in a node level and corresponds to the portion of content occupying the corresponding hierarchical position in the corresponding hierarchical level.

At reorder operation 1016, a node position within a node level of the hierarchical structure may be reordered in the graphics pane. Reordering may be initiated automatically by selection of a node in a node position of a node level and activation of a reorder control element or other suitable command. Any child nodes associated with the node may also be reordered within a child node level.

At automatically reorder operation 1018, a portion of content in a corresponding hierarchical position within a corresponding hierarchical level of the hierarchical format of the content may be automatically reordered and substantially simultaneously displayed in the content pane. Further, any child portions of content associated with the portion of content in the corresponding hierarchical position may also be automatically reordered. That is, the associated child portions of content may also be automatically reordered within a child hierarchical level and substantially simultaneously displayed in the content pane.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In other words, functional elements being performed by a single or multiple components, in various combinations of hardware and software, and individual functions can be distributed among software applications at either the client or server level. In this regard, any number of the features of the different embodiments described herein may be combined into one single embodiment and alternative embodiments having fewer than or more than all of the features herein described are possible.

While various embodiments have been described for purposes of this disclosure, various changes and modifications may be made which are well within the scope of the present disclosure. Numerous other changes may be made which will readily suggest themselves to those skilled in the art and which are encompassed in the spirit of the disclosure and as defined in the appended claims.

What is claimed is:

1. A computer storage device storing computer-executable instructions for editing graphical content that when executed by a processing unit cause a computing system to perform a method, the method comprising:
   receiving content in a first pane of a user interface, wherein the content comprises a plurality of content portions displayed in a hierarchical format, wherein a first content portion occupies a first hierarchical position and a second content portion occupies a second hierarchical position;
   generating graphical content in a second pane of the user interface, wherein the graphical content comprises a plurality of nodes in a hierarchical diagram corresponding to the hierarchical format, wherein a first node corresponds to the first content portion and occupies a first node position corresponding to the first hierarchical position, and wherein a second node corresponds to the second content portion and occupies a second node position corresponding to the second hierarchical position;
   receiving a change to the content in the first pane, wherein the change includes reordering the first content portion from the first hierarchical position to a different hierarchical position; and
   automatically reordering the first node from the first node position to a different node position of the graphical content in the second pane, wherein automatically reordering the first node from the first node position to the different node position of the graphical content in the second pane corresponds to the reordering of the first content portion from the first hierarchical position to the different hierarchical position of the content in the first pane.

2. The computer storage device of claim 1, further comprising:
   selecting one of the plurality of content portions for reordering, wherein the selected content portion further comprises a child content portion.

3. The computer storage medium of claim 2, further comprising:
   displaying a menu comprising options for reordering the selected content portion.

4. The computer storage device of claim 3, wherein the selected content portion is in a highest hierarchical position within a hierarchical level of the content, the method further comprising:
only displaying an option for reordering the selected first content portion down within the hierarchical level.

5. The computer storage device of claim 3, wherein the selected content portion is in a lowest hierarchical position within a hierarchical level of the content, the method further comprising:
only displaying an option for reordering the selected content portion up within the hierarchical level.

6. The computer storage device of claim 2, wherein when the selected content portion is reordered the child content portion is reordered along with the selected content portion.

7. The computer storage device of claim 6, wherein a child node corresponding to the child content portion is customized, and wherein the child node remains customized when the child node is reordered with a node corresponding to the selected content portion.

8. A computer system, comprising:
at least one processor; and
at least one memory, communicatively coupled to the at least one processor and containing computer-readable instructions that, when executed by the at least one processor, perform a method for editing a hierarchical diagram, the method comprising:
receiving content in a first window of a user interface, wherein the content comprises a plurality of content portions displayed in a hierarchical format, wherein a first content portion occupies a first hierarchical position and a second content portion occupies a second hierarchical position;
receiving a selection of at least one of a plurality of graphical definitions, wherein the at least one selected graphical definition comprises a layout and a style for presenting the content;
generating graphical content in a second window of the user interface, wherein the graphical content is generated based at least in part on the selected at least one graphical definition, wherein the graphical content comprises a plurality of nodes in a hierarchical diagram corresponding to the hierarchical format, wherein a first node corresponds to the first content portion and occupies a first node position corresponding to the first hierarchical position, and wherein a second node corresponds to the second content portion and occupies a second node position corresponding to the second hierarchical position;
receiving a change to the content in the first window, wherein the change includes reordering the first content portion from the first hierarchical position to a different hierarchical position; and
automatically reordering the first node from the first node position to a different node position of the graphical content in the second window, wherein automatically reordering the first node from the first node position to the different node position in the graphical content corresponds to the reordering of the first content portion from the first hierarchical position to the different hierarchical position in the content.

9. The computer system of claim 8, further comprising:
selecting one of the plurality of content portions for reordering, wherein the selected content portion further comprises a child content portion.

10. The computer system of claim 9, further comprising:
displaying a menu comprising options for reordering the selected content portion.

11. The computer system of claim 10, wherein the selected content portion is in a highest hierarchical position within a hierarchical level of the content, the method further comprising:
only displaying an option for reordering the selected first content portion in the first hierarchical position down within the hierarchical level.

12. The computer system of claim 10, wherein the selected content portion is in a lowest hierarchical position within a hierarchical level of the content, the method further comprising:
only displaying an option for reordering the selected first content portion up within the hierarchical level.

13. The computer system of claim 9, wherein when the selected content portion is reordered the child content portion is reordered along with the selected content portion.

14. The computer system of claim 13, wherein a child node corresponding to the child content portion is customized, and wherein the child node remains customized when the child node is reordered with a node corresponding to the selected content portion.

15. The computer system of claim 13, wherein a child node corresponding to the child content portion is customized, wherein a new selection of the one or more graphical definitions is received, and wherein the child node reverts to a default graphical definition when the child node is reordered with a node corresponding to the selected content portion.

16. A computer-implemented method for editing a graphical content, the method comprising:
accepting content in a first pane of a user interface, wherein the content comprises a plurality of content portions displayed in a hierarchical format, wherein a first content portion occupies a first hierarchical position and a second content portion occupies a second hierarchical position;
generating graphical content in a second pane of the user interface, wherein the graphical content comprises a plurality of nodes in a hierarchical diagram corresponding to the hierarchical format, wherein a first node corresponds to the first content portion and occupies a first node position corresponding to the first hierarchical position, and wherein a second node corresponds to the second content portion and occupies a second node position corresponding to the second hierarchical position;
receiving a change to the graphical content in the second pane, wherein the change includes reordering the first node from the first node position to a different node position; and
automatically reordering the first content portion from the first hierarchical position to a different hierarchical position of the content in the first pane, wherein automatically reordering the first content portion from the first hierarchical position to a different hierarchical position in the content corresponds to the reordering of the first node from the first node position to the different node position in the graphical content.

17. The computer-implemented method of claim 16, further comprising:
selecting one of the plurality of nodes for reordering, wherein the selected node further comprises a child node.

18. The computer-implemented method of claim 17, further comprising:
  displaying a menu comprising options for reordering the selected node.

19. The computer-implemented method of claim 18, wherein the selected node is in a highest node position within a hierarchical level of the hierarchical diagram, the method further comprising:
  only displaying an option for reordering the selected node down within the hierarchical level.

20. The computer-implemented method of claim 18, wherein the selected node is in a lowest node position within a hierarchical level of the hierarchical diagram, the method further comprising:
  only displaying an option for reordering the selected node up within the hierarchical level.

\* \* \* \* \*